United States Patent
Wang et al.

(10) Patent No.: US 12,483,954 B2
(45) Date of Patent: Nov. 25, 2025

(54) METHOD AND APPARATUS FOR CONFIGURING CHANNEL RESOURCE

(71) Applicant: Telefonaktiebolaget LM Ericsson (publ), Stockholm (SE)

(72) Inventors: Yi Wang, Beijing (CN); Huaisong Zhu, Beijing (CN); Yanyan Zhu, Beijing (CN); Zhi Ge, Beijing (CN); Ruiling Zheng, Guangzhou (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 512 days.

(21) Appl. No.: 17/920,727

(22) PCT Filed: Apr. 21, 2020

(86) PCT No.: PCT/CN2020/085916
§ 371 (c)(1),
(2) Date: Oct. 21, 2022

(87) PCT Pub. No.: WO2021/212321
PCT Pub. Date: Oct. 28, 2021

(65) Prior Publication Data
US 2023/0171657 A1 Jun. 1, 2023

(51) Int. Cl.
  *H04W 36/06* (2009.01)
  *H04B 7/06* (2006.01)
  *H04W 72/0453* (2023.01)

(52) U.S. Cl.
  CPC .......... *H04W 36/06* (2013.01); *H04B 7/0619* (2013.01); *H04B 7/0626* (2013.01);
  (Continued)

(58) Field of Classification Search
  CPC . H04W 36/06; H04W 72/0453; H04W 24/10; H04W 24/08; H04B 7/0619; H04B 7/0626; H04B 7/0632; H04B 7/0634
  See application file for complete search history.

(56) References Cited

U.S. PATENT DOCUMENTS

2015/0358881 A1* 12/2015 Cui .................. H04B 17/318
                                                    455/436
2018/0278392 A1*  9/2018 Onggosanusi ...... H04L 5/0048
(Continued)

FOREIGN PATENT DOCUMENTS

EP    3443704 A2    2/2019
WO    2017173133 A1   10/2017
(Continued)

OTHER PUBLICATIONS

3rd Generation Partnership Project; Technical Specification Group Radio Access Network; NR; Physical layer procedures for control (Release 15), 3GPP TS 38.213 V15.4.0 (Dec. 2018), 104 pages.
(Continued)

*Primary Examiner* — Yu-Wen Chang
(74) *Attorney, Agent, or Firm* — Rothwell, Figg, Ernst & Manbeck, P.C.

(57) ABSTRACT

Embodiments of the present disclosure provide methods and apparatus for configuring channel resource. A method performed at a network node may comprise: determining (S101) a need to change radio frequency of a cell served by the network node; determining (S102) whether a configuration for channel resource to which the radio frequency to be changed has been received by a terminal device served in the cell; and transmitting (S103), to the terminal device, an indicator for the configuration for the channel resource, in response to that the configuration for the channel resource has been received by the terminal device. According to embodiments of the present disclosure, the network node may just transmit an indicator for the configuration for the channel resource, and thus the messages in the communication network needed to configure channel resource may be reduced.

16 Claims, 21 Drawing Sheets

(52) U.S. Cl.
CPC ......... *H04B 7/0632* (2013.01); *H04B 7/0634* (2013.01); *H04W 72/0453* (2013.01)

(56) References Cited

U.S. PATENT DOCUMENTS

| | | | |
|---|---|---|---|
| 2019/0141742 A1 | 5/2019 | Zhou et al. | |
| 2019/0215870 A1* | 7/2019 | Babaei | H04L 5/0098 |
| 2019/0260447 A1 | 8/2019 | Nam et al. | |
| 2019/0306915 A1* | 10/2019 | Jin | H04W 76/28 |
| 2019/0356444 A1* | 11/2019 | Noh | H04W 72/23 |
| 2019/0357264 A1 | 11/2019 | Yi et al. | |
| 2020/0313831 A1* | 10/2020 | Kim | H04L 5/001 |
| 2021/0203387 A1* | 7/2021 | Park | H04L 5/001 |
| 2021/0218455 A1* | 7/2021 | Park | H04L 5/0048 |

FOREIGN PATENT DOCUMENTS

| | | |
|---|---|---|
| WO | 2017196246 A2 | 11/2017 |
| WO | 2019192381 A1 | 10/2019 |

OTHER PUBLICATIONS

3rd Generation Partnership Project; Technical Specification Group Radio Access Network; Evolved Universal Terrestrial Radio Access (E-UTRA); Physical layer procedures (Release 10), 3GPP TS 36.213 V10.0.0 (Dec. 2010), 98 pages.
International Search Report and the Written Opinion of the International Searching Authority, issued in corresponding International Application No. PCT/CN2020/085916, dated Jan. 20, 2021, 6 pages.
MTI "Remaining details on CSI Reporting" 3GPP TSG-RAN WG1 #92-Bis, R1-1804499, Sanya, China, Apr. 16-20, 2018, 6 pages.

* cited by examiner

METHOD AND APPARATUS FOR CONFIGURING CHANNEL RESOURCE

CROSS REFERENCE TO RELATED APPLICATION(S)

This application is a 35 U.S.C. § 371 National Phase Entry Application of PCT/CN2020/085916, filed Apr. 21, 2020, designating the United States, the disclosure of which is incorporated herein by reference in its entirety.

TECHNICAL FIELD

The present disclosure relates generally to the technology of wireless communication, and in particular, to methods and apparatuses for configuring channel resource.

BACKGROUND

This section introduces aspects that may facilitate better understanding of the present disclosure. Accordingly, the statements of this section are to be read in this light and are not to be understood as admissions about what is in the prior art or what is not in the prior art.

In a wireless communication system, when a terminal device is registered in a cell, the terminal device is able to use particular time/frequency resource to communication with a network node serving the cell. Such time/frequency resource may be also referred as channel or channel resource.

In some cases, such channel resource configured for the terminal device may vary. For example, a range of the radio frequency that could be used for the terminal device may have to be changed due to conflict/adaptation between different cells or different Radio Access Technologies, RATs. Then, the network node may inform/reconfigure such change of channel resource for the terminal device, usually via a procedure of radio resource control, RRC, reconfiguration.

However, the procedure of RRC reconfiguration will cause exchanging several messages between the network node and the terminal device. Thus, when there are many terminal devices being informed about the changed channel resource, a lot of RRC reconfiguration signals maybe sent in the same time and may bring up the signal storm.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein. Improved methods and apparatuses for configuring channel resource may be provided. Particularly, the messages in the communication network needed to configure channel resource may be reduced.

A first aspect of the present disclosure provides method performed at a network node, comprising: determining a need to change radio frequency of a cell served by the network node; determining whether a configuration for channel resource to which the radio frequency to be changed has been received by a terminal device served in the cell; and transmitting, to the terminal device, an indicator for the configuration for the channel resource, in response to that the configuration for the channel resource has been received by the terminal device.

In embodiments of the present disclosure, a reference signal is transmitted in the channel resource to indicate channel quality of the channel resource.

In embodiments of the present disclosure, the reference signal comprises a channel state information reference signal, CSI-RS.

In embodiments of the present disclosure, the indicator further indicates at least one subband in the channel resource; and wherein channel state information of the at least one subband is required to be reported to the network node.

In embodiments of the present disclosure, the indicator is included in a field of downlink control information, DCI.

In embodiments of the present disclosure, the indicator comprises a non-zero codepoint of a channel state information, CSI, request field.

In embodiments of the present disclosure, the method may further comprise: transmitting, to the terminal device, the configuration for channel resource to which the radio frequency to be changed, if the configuration for the channel resource has not been received by the terminal device. The configuration for channel resource is transmitted to the terminal device, via radio resource control, RRC, reconfiguration.

In embodiments of the present disclosure, the method may further comprise: determining a capability of the terminal device for storing configuration for channel resource; and transmitting, to the terminal device, the configuration for channel resource according to the capability of the terminal device, via radio resource control, RRC, reconfiguration.

In embodiments of the present disclosure, the network node comprises a base station.

A second aspect of the present disclosure provides a method performed at a terminal device, comprising: receiving, from a network node serving a cell in which the terminal device is registered, an indicator for a configuration for channel resource to which radio frequency of the cell to be changed. The configuration for the channel resource has been received by the terminal device. The cell is one of multiple cells the network node serves.

In embodiments of the present disclosure, a reference signal is transmitted in the channel resource to indicate channel quality of the channel resource.

In embodiments of the present disclosure, the reference signal comprises a channel state information reference signal, CSI-RS.

In embodiments of the present disclosure, the indicator further indicates at least one subband in the channel resource; and wherein channel state information of the at least one subband is required to be reported to the network node.

In embodiments of the present disclosure, the indicator is included in a field of downlink control information, DCI.

In embodiments of the present disclosure, the indicator comprises a non-zero codepoint of a channel state information, CSI, request field.

In embodiments of the present disclosure, the method may further comprise: receiving, from the network node, another configuration for channel resource. The another configuration for channel resource has not been received by and thus not stored in the terminal device. The another configuration for channel resource is received from the network node, via radio resource control, RRC, reconfiguration.

In embodiments of the present disclosure, the method may further comprise: reporting, to the network node, a capability of the terminal device for storing configuration for channel resource; and receiving, from the network node, the configuration for the channel resource, via radio resource control, RRC, reconfiguration.

In embodiments of the present disclosure, the network node comprises a base station.

A third aspect of the present disclosure provides a network node, comprising: a processor; and a memory, the memory containing instructions executable by the processor, whereby the network node is operative to: determine a need to change radio frequency of a cell served by the network node; determine whether a configuration for channel resource to which the radio frequency to be changed has been received by a terminal device served in the cell; and transmit, to the terminal device, an indicator for the configuration for the channel resource, in response to that the configuration for the channel resource has been received by the terminal device.

In embodiments of the present disclosure, the network node is operative to perform the method according to any embodiment of the first aspect.

A fourth aspect of the present disclosure provides a terminal device, comprising: a processor; and a memory, the memory containing instructions executable by the processor, whereby the terminal device is operative to: receive, from a network node serving a cell on which the terminal device camps, an indicator for a configuration for channel resource to which radio frequency of the cell to be changed. The configuration for the channel resource has been received by the terminal device. The cell is one of multiple cells the network node serves.

In embodiments of the present disclosure, the terminal device is operative to perform the method according to any embodiment of the second aspect.

A fifth aspect of the present disclosure provides a computer-readable storage medium storing instructions which when executed by at least one processor, cause the at least one processor to perform the method according to any embodiment of the first and second aspects.

Embodiments herein afford many advantages. For example, in some embodiments herein, the network node may just transmit an indicator for the configuration for the channel resource, and thus the messages in the communication network needed to configure channel resource may be reduced. A person skilled in the art will recognize additional features and advantages upon reading the following detailed description.

BRIEF DESCRIPTION OF DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1A:
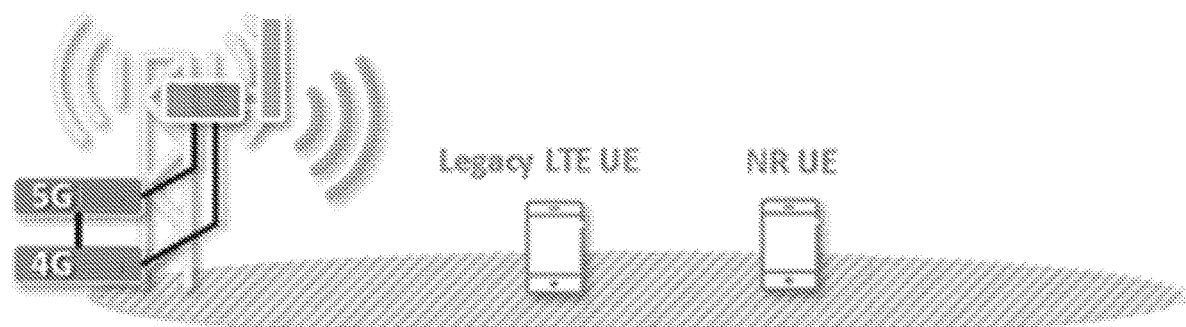
FIG. 1A is an exemplary diagram showing different UE served by the same base station.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the term "network" or "communication network" refers to a network following any suitable wireless communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols.

The term "network node" used herein refers to a network device or network entity or network function or any other devices (physical or virtual) in a communication network. For example, the network node in the network may include a base station (BS), an access point (AP), a multi-cell/multicast coordination entity (MCE), a server node/function (such as a service capability server/application server, SCS/AS, group communication service application server, GCS AS, application function, AF), an exposure node/function (such as a service capability exposure function, SCEF, network exposure function, NEF), a unified data management, UDM, a home subscriber server, HSS, a session management function, SMF, an access and mobility management function, AMF, a mobility management entity, MME, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node may comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like.

Further, the term "network node" may also refer to any suitable function which can be implemented in a network entity (physical or virtual) of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), etc. In other embodiments, the network function may comprise different types of NFs (such as PCRF (Policy and Charging Rules Function), etc.) for example depending on the specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and (or) B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

For example, for initial stage of 5G NR ($5^{th}$ generation new radio) deployment, one of most typical configuration for NR is to share spectrum or partially share spectrum resources with 4G ($4^{th}$ generation) network with the help of mix mode radio, with more and more UE (user equipment) phase out from 4G network and more and more UE emerging in 5G network, spectrum resource will gradually shift from 4G to 5G, which can flexibly balance near term and long term network requirement.

Table 1 is an exemplary configuration for NR rollout, there will be 40 MHz spectrum shared with LTE (Long Term Evolution).

TABLE 1

| MHz | 2515 | 2575 | 2635 | 2675 |
|---|---|---|---|---|
| Usage | NR only | LTE/NR sharing | | LTE only |

Figure 1B:
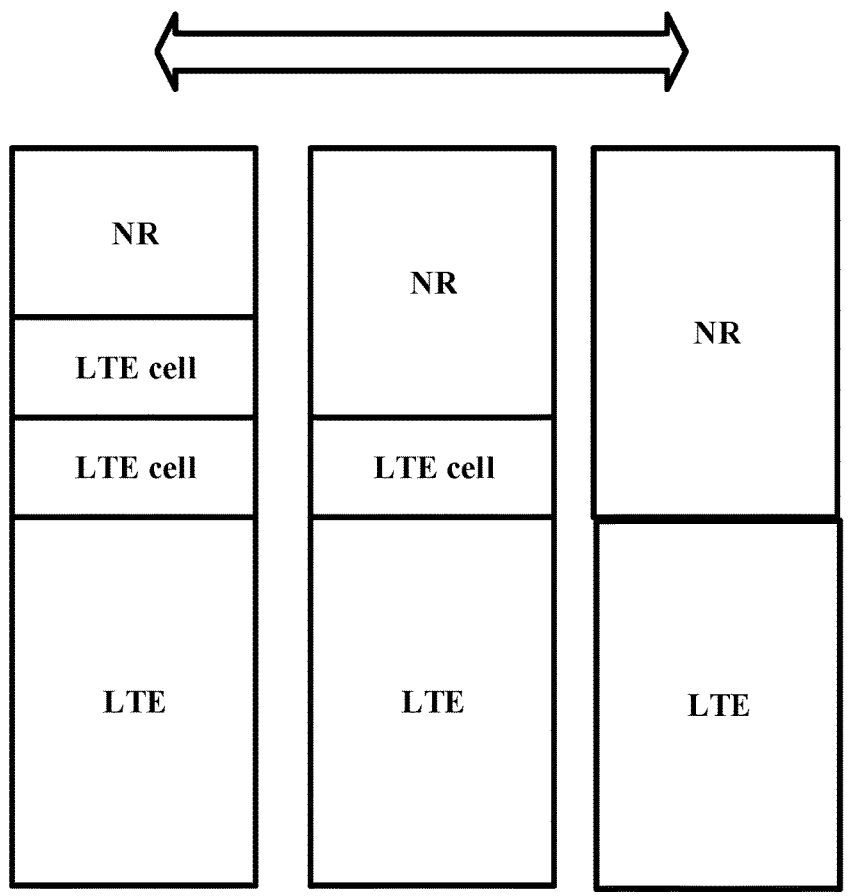
FIG. 1B is an exemplary diagram showing different arrangements of the radio frequency.

FIG. 1A is an exemplary diagram showing different UE served by the same base station. FIG. 1B is an exemplary diagram showing different arrangements of the radio frequency.

As for how to share that spectrum between LTE and NR, i.e. serving the legacy LTE UEs and the NR UEs at the same time. There are multiple choices, while the most attractive/simplest solution is Carrier-level spectrum sharing.

For example, in carrier level spectrum sharing scheme, NR has dedicated BW (bandwidth), LTE cell(s) share with NR for the whole bandwidth of the network node. Actual number of shared LTE cells is in line with traffic requirement. As shown in the FIG. 1B and referring to table 1, three exemplary arrangements are shown. Namely, one arrangement is that no sharing spectrum is allocated to NR, another arrangement is that part of the sharing spectrum is allocated to NR, and still another arrangement is that all of the sharing spectrum is allocated to NR.

Figure 1C:
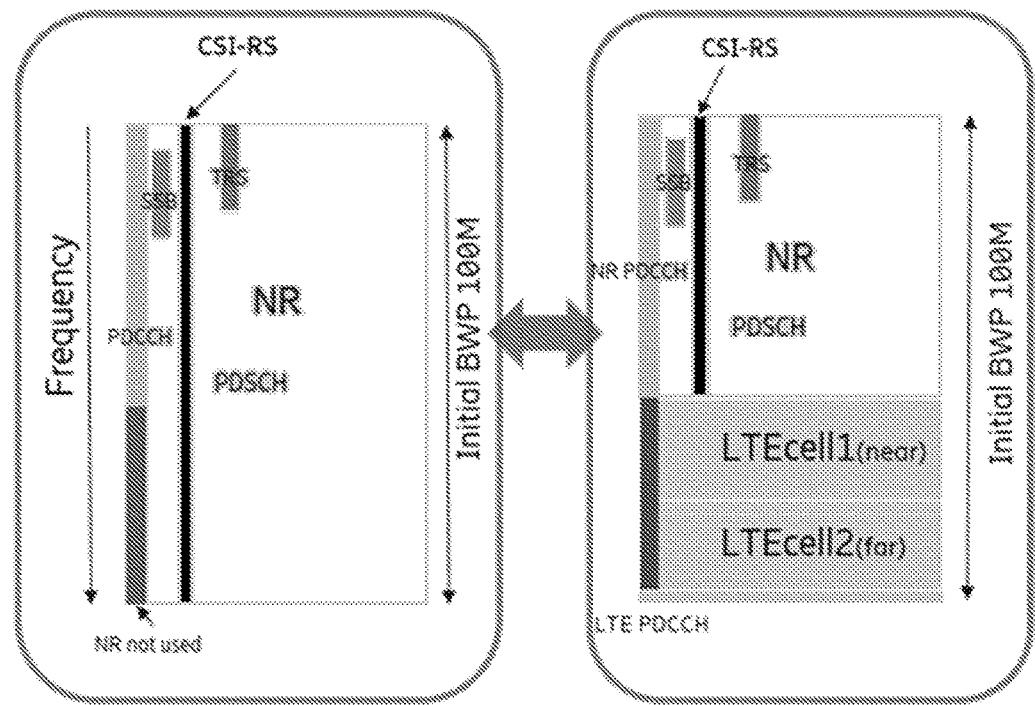
FIG. 1C is an exemplary diagram showing the change of available resource for communication signals during spectrum sharing.

FIG. 1C is an exemplary diagram showing the change of available resource for communication signals during spectrum sharing.

When spectrum sharing, NR signals may conflict with the LTE signals which will introduce the interference to LTE side. If NR signals (e.g. CSI-RS) is still sent in LTE band, it will be interfered by LTE signals or LTE PDSCH (physical downlink share channel). The UE receiving CSI-RS signal will be impacted and the CSI report from the UE will be not accurately, thereby impacting the NR scheduler, in the meantime, the LTE signals and traffic will also be impacted by NR signals.

The NR PDCCH/SSB (synchronizing signal block)/TRS (Tracking Reference Signal)/CSI-RS signal need to be controlled in spectrum sharing, one exemplary method is to try to keep all NR signals in the NR dedicate band, which can avoid bring the interference to LTE. For example, in the FIG. 1C, the resource for CSI-RS is obviously reduced when more cells (such as LTEcell1 and LTEcell2) in the initial BWP 100M are used for LTE.

Figure 2A:
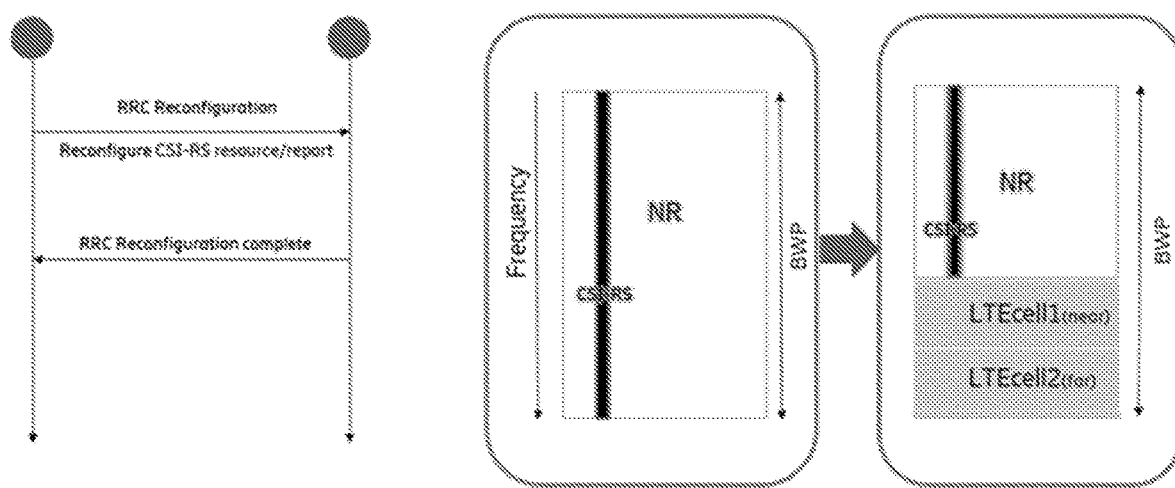
FIG. 2A is an exemplary diagram showing CSI-RS signal reconfiguration in spectrum sharing.
Figure 2B:
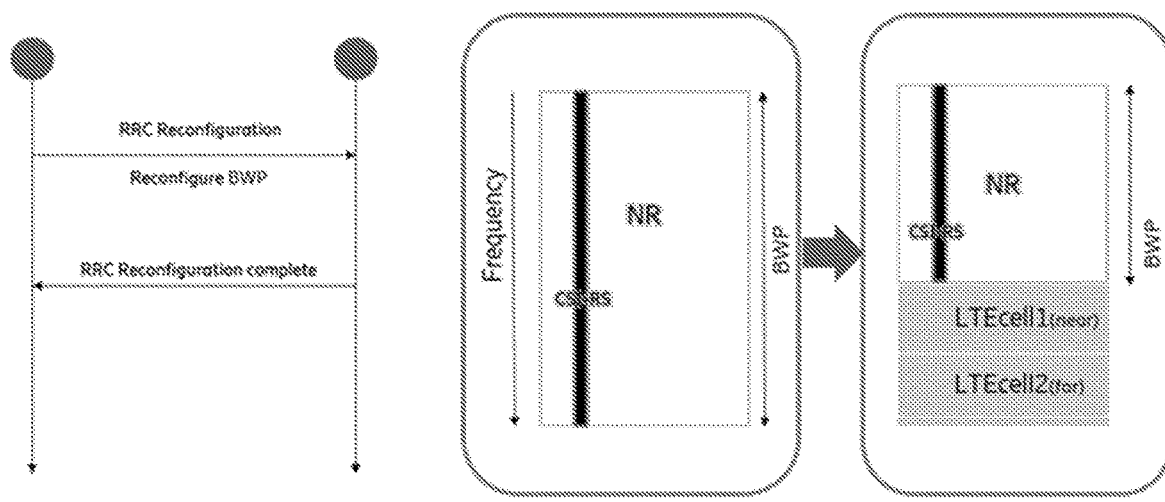
FIG. 2B is an exemplary diagram showing BWP reconfiguration in spectrum sharing.

FIG. 2A is an exemplary diagram showing CSI-RS signal reconfiguration in spectrum sharing. FIG. 2B is an exemplary diagram showing BWP reconfiguration in spectrum sharing.

Carrier level spectrum sharing is efficient but need to lock/unlock the LTE cell to share the whole LTE bandwidth to NR, when enable spectrum sharing to flexible partition of resources between NR and LTE, the signal in each side should be controlled to avoid impact on the other side, especially for NR CSI-RS signal, which will be changed with the BWP (band width part). In carrier level spectrum sharing, the common method is to reconfigure the CSI-RS as in FIG. 2A or to reconfigure the BWP as in FIG. 2B, which can provide the CSI-RS signal be limited in the NR dedicate band.

In FIG. 2A, the configuration for BWP itself is the same, while the radio frequency resource for CSI-RS is reduced. In FIG. 2B, the configuration for BWP is changed to have less frequency resource, while the radio frequency resource for CSI-RS is thus also reduced.

One typical scenario is that many NR UEs are served in a cell by a network node and when it is decided to change bandwidth of the cell during spectrum sharing, an RRC reconfiguration message should be respectively sent to every UE of the cell to inform bandwidth change, a lot of RRC reconfiguration signals may be sent in the same time and may bring up the signal storm.

Figure 3:
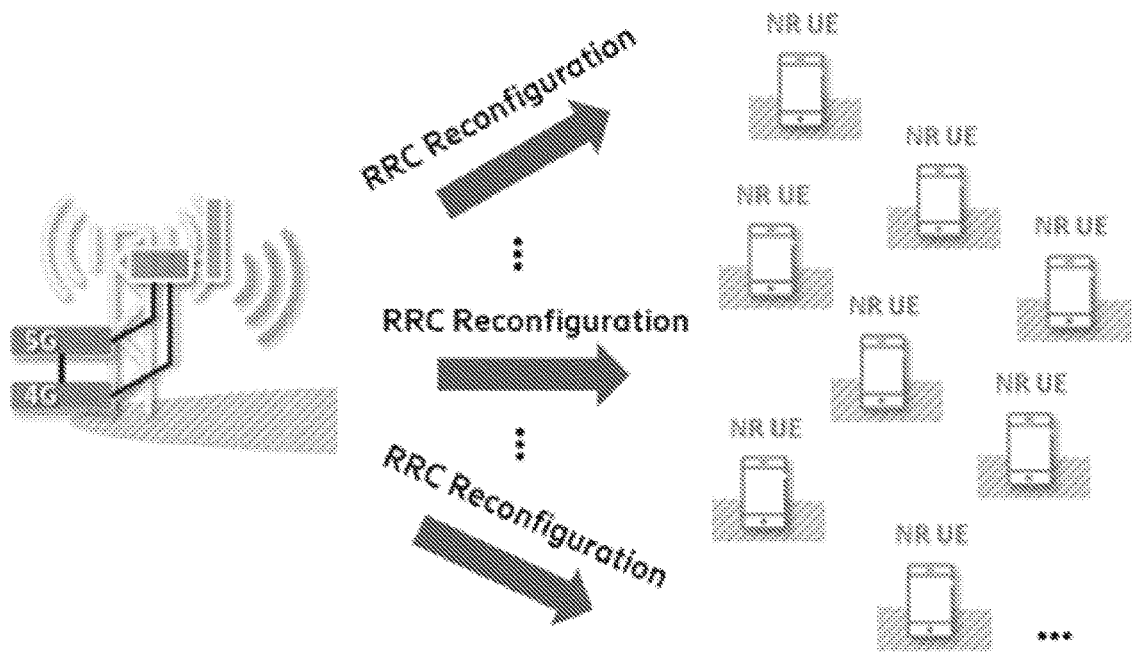
FIG. 3 is an exemplary diagram showing RRC reconfiguration in spectrum sharing.

FIG. 3 is an exemplary diagram showing RRC reconfiguration in spectrum sharing.

For example, when using RRC-reconfiguration signal to inform UE during spectrum sharing, under the worst case, i.e. 1000 UEs are attached to the cell and need to be reconfigured in the same time, it is obvious that the capacity of network will be impacted. Even in many other not-worst scenarios, the communication system will still cost many signals and thus cause a signal storm.

Further, if RRC-reconfiguration signal is used, the gNB need to wait the UE response to change the CSI-RS and PDSCH schedule, which means the CSI-RS and PDSCH schedule will be kept in the old ABW until RRC reconfiguration complete signal is received from UE, in which case it requires a long time window for bandwidth change.

In this disclosure, the inventors propose to minimize the impact on KPI (Key Performance Indicator) which is caused by the RRC-reconfiguration. For such utilization, embodiments of the present disclosure will provide multiple configuration manners for channel resource in the following description to be used instead of RRC reconfiguration.

Figure 4A:
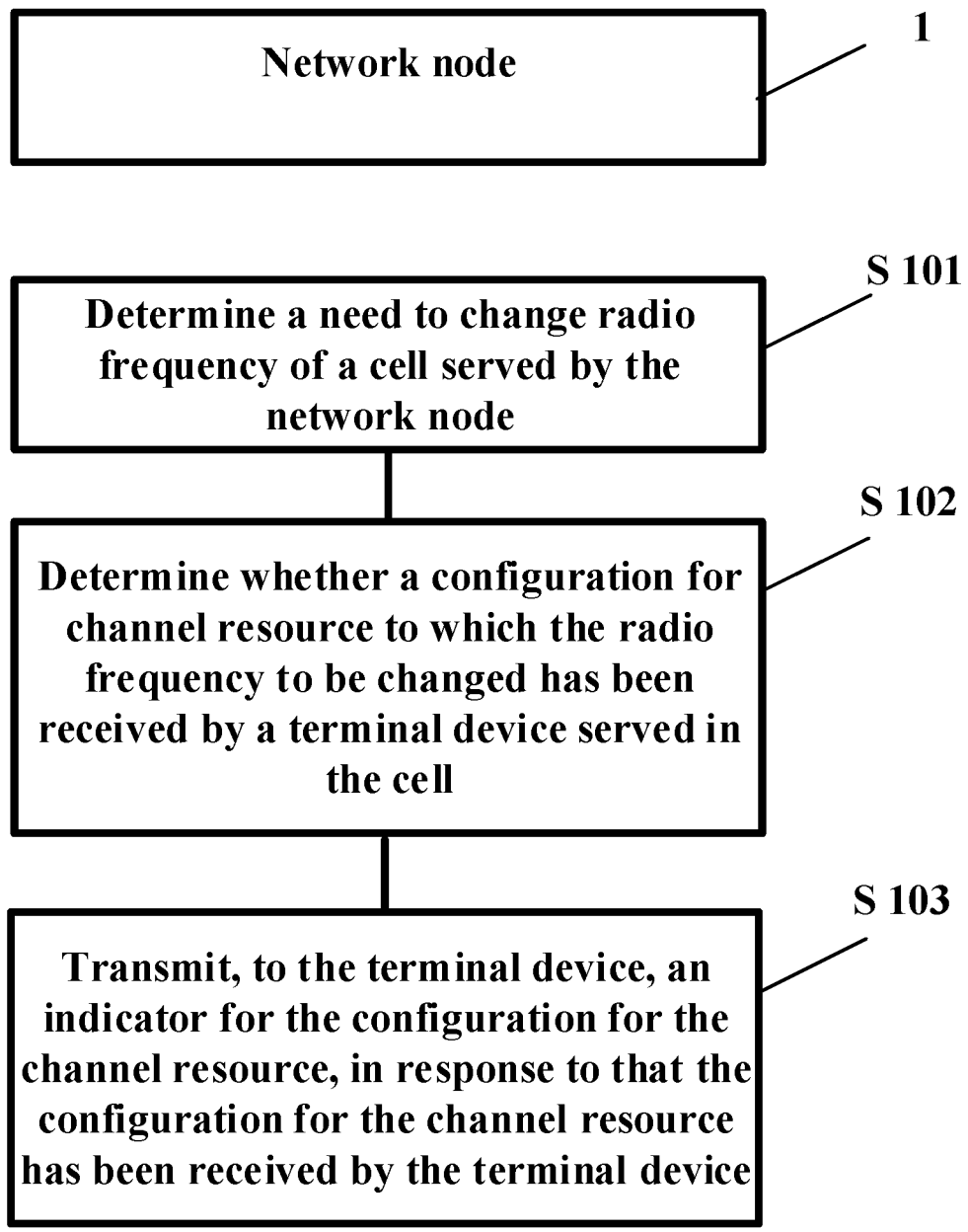
FIG. 4A is an exemplary flowchart of a method performed at a network node for configuring channel resource, according to embodiments of the present disclosure.

FIG. 4A is an exemplary flowchart of a method performed at a network node for configuring channel resource, according to embodiments of the present disclosure.

As shown in FIG. 4A, the method performed at a network node 1 may comprise: S101, determining a need to change radio frequency of a cell served by the network node; S102, determining whether a configuration for channel resource to which the radio frequency to be changed has been received by a terminal device served in the cell; and S103, transmitting, to the terminal device, an indicator for the configuration for the channel resource, in response to that the configuration for the channel resource has been received by the terminal device.

According to embodiments of the present disclosure, the network node 1 may transmit only an indicator for the configuration for the channel resource. An RRC reconfiguration procedure will be not necessary, thus RRC reconfiguration back-and-forth signals and air interface resource spent therefor for configuring channel resource may be reduced. Moreover, time window for the change of radio frequency is shortened.

In embodiments of the present disclosure, for example, the network node comprises a base station. The radio frequency change can be bandwidth change of the cell served by the base station. Bandwidth change leads to channel resource change of the cell. Therefore, configuration of channel resource is notified via the indicator.

In embodiments of the present disclosure, a reference signal is transmitted in the channel resource to indicate channel quality of the channel resource.

According to embodiments of the present disclosure, when channel resource is configured for a terminal device, the terminal device may firstly measure a received reference signal transmitted in such channel to obtain a channel state/quality about the channel resource. Such state/quality information may be used to determine whether a subsequent communication between the network node 1 and the terminal device 2 should be performed using such channel resource.

In embodiments of the present disclosure, the reference signal comprises a channel state information reference signal, CSI-RS. It should be understood, any other kind of reference signal may also be used.

In embodiments of the present disclosure, the indicator is included in a field of downlink control information, DCI.

According to embodiments of the present disclosure, a DCI could be used to carry such indicator. Thus, when the terminal device receives a PDCCH signalling including such DCI, the terminal device will directly be indicated to use a specific configuration for channel resource for the subsequent communication. No extra message or complicated interface as in the RRC reconfiguration procedure is needed between the network node and the terminal device.

In embodiments of the present disclosure, the indicator comprises a non-zero codepoint of a channel state information, CSI, request field. It should be understood, any other kind of code point may also be used.

According to embodiments of the present disclosure, the number of codes occupied in a message is also reduced, since the terminal device only needs to know an index or the like of the configuration for channel resource.

Figure 4B:
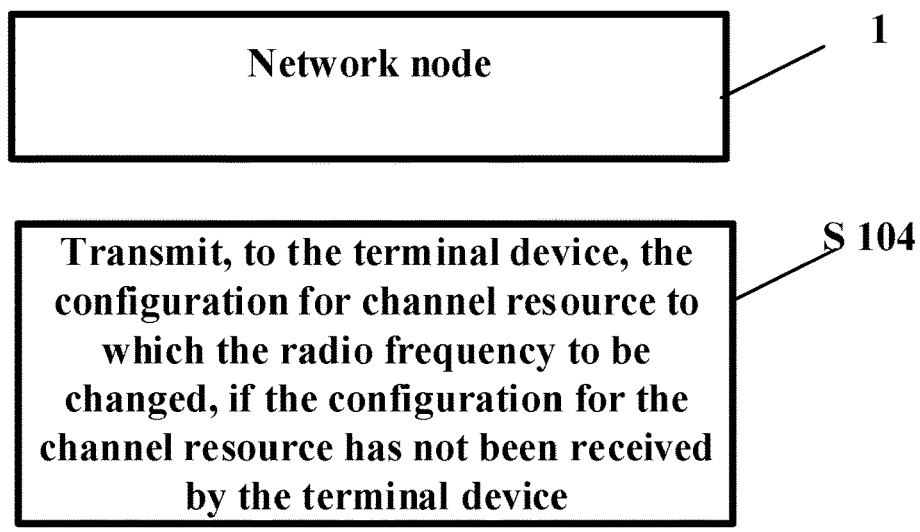
FIG. 4B is an exemplary flowchart showing an additional step of the method performed at the network node for configuring channel resource, according to embodiments of the present disclosure.

FIG. 4B is an exemplary flowchart showing an additional step of the method performed at the network node for configuring channel resource, according to embodiments of the present disclosure.

In embodiments of the present disclosure, the method may further comprise: S104, transmitting, to the terminal device, the configuration for channel resource to which the radio frequency to be changed, if the configuration for the channel resource has not been received by the terminal device. The configuration for channel resource is transmitted to the terminal device, via radio resource control, RRC, reconfiguration.

According to embodiments of the present disclosure, for those configurations which the terminal device has not received, the compatibility is still provided. Such configuration for channel resource may still be transmitted to the terminal device, via radio resource control, RRC, reconfiguration.

Figure 4C:
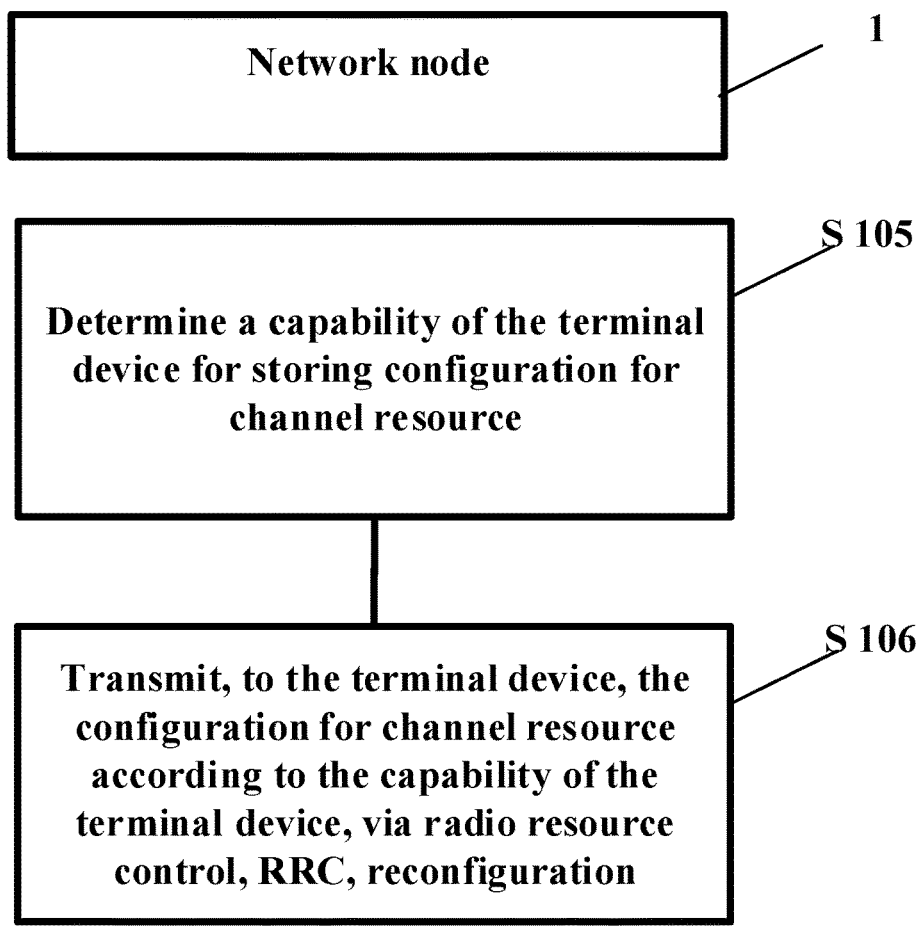
FIG. 4C is an exemplary flowchart showing additional steps of the method performed at the network node for configuring channel resource, according to embodiments of the present disclosure.

FIG. 4C is an exemplary flowchart showing additional steps of the method performed at the network node for configuring channel resource, according to embodiments of the present disclosure.

In embodiments of the present disclosure, the method may further comprise: S105, determining a capability of the terminal device for storing configuration for channel resource; and S106, transmitting, to the terminal device, the configuration for channel resource according to the capability of the terminal device, via radio resource control, RRC, reconfiguration.

According to embodiments of the present disclosure, the network node can preconfigure a plurality of configurations and send them to the terminal device, according to the capability of the terminal device. In the subsequent communication, in response a determination of changing to one of the plurality of configurations, the network node will transmit an indicator for the one of the plurality of configurations, as mentioned above.

Figure 5A:
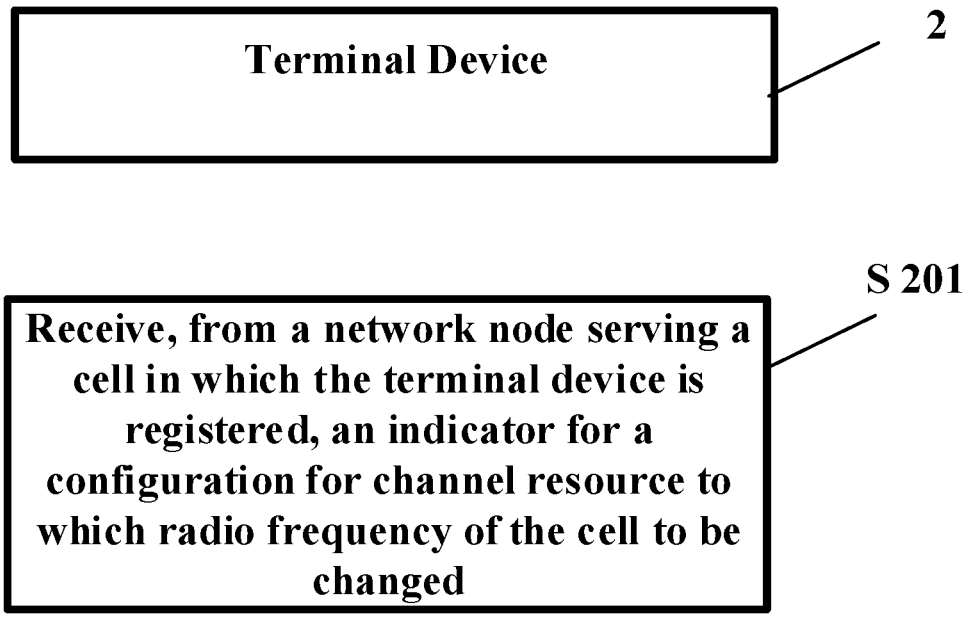
FIG. 5A is an exemplary flowchart of a method performed at a terminal device for configuring channel resource, according to embodiments of the present disclosure.

FIG. 5A is an exemplary flowchart of a method performed at a terminal device for configuring channel resource, according to embodiments of the present disclosure.

The method performed at a terminal device 2 may comprise: S201, receiving, from a network node serving a cell in which the terminal device is registered, an indicator for a configuration for channel resource to which radio frequency of the cell to be changed. The configuration for the channel resource has been received by the terminal device. The cell is one of multiple cells the network node serves. The radio frequency to be changed can be bandwidth change of the cell. Change of the bandwidth of the cell means channel resource also being changed, thus configuration of channel resource is notified by the indicator.

According to embodiments of the present disclosure, for the configuration for channel resource which has been received by the terminal device, an indicator will be used for configuring radio frequency change. The possibility of a signal storm due to configuring radio frequency change will be greatly reduced.

Figure 5B:
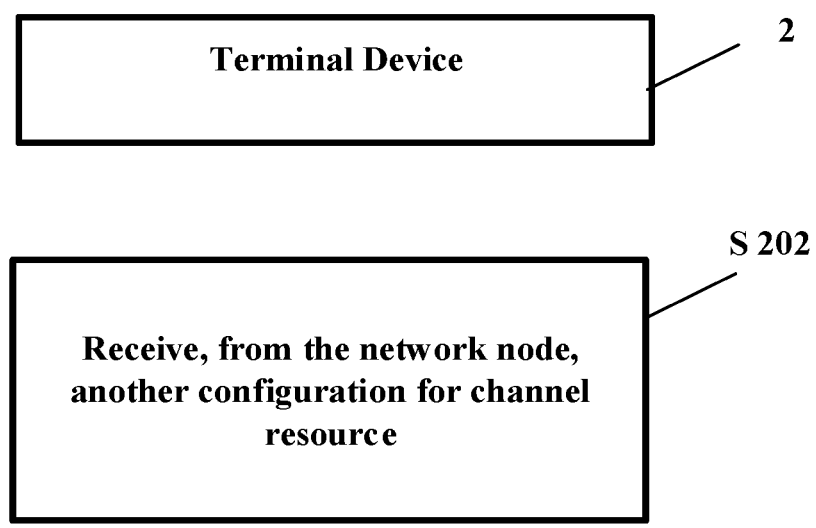
FIG. 5B is an exemplary flowchart showing an additional step of the method performed at the terminal device for configuring channel resource, according to embodiments of the present disclosure.

FIG. 5B is an exemplary flowchart showing an additional step of the method performed at the terminal device for configuring channel resource, according to embodiments of the present disclosure.

In embodiments of the present disclosure, the method may further comprise: S202, receiving, from the network node, another configuration for channel resource. The another configuration for channel resource is not sent to the terminal device and thus not stored by the terminal device, because of the network node's knowledge about the terminal device's capability of storing of channel resource configuration. The another configuration for channel resource is received from the network node, via radio resource control, RRC, reconfiguration, when radio frequency of the cell is decided to be changed.

According to embodiments of the present disclosure, for the configuration which has not been received by the terminal device, an RRC reconfiguration procedure can still be used for configuring radio frequency change. The compatibility is remained.

Figure 5C:
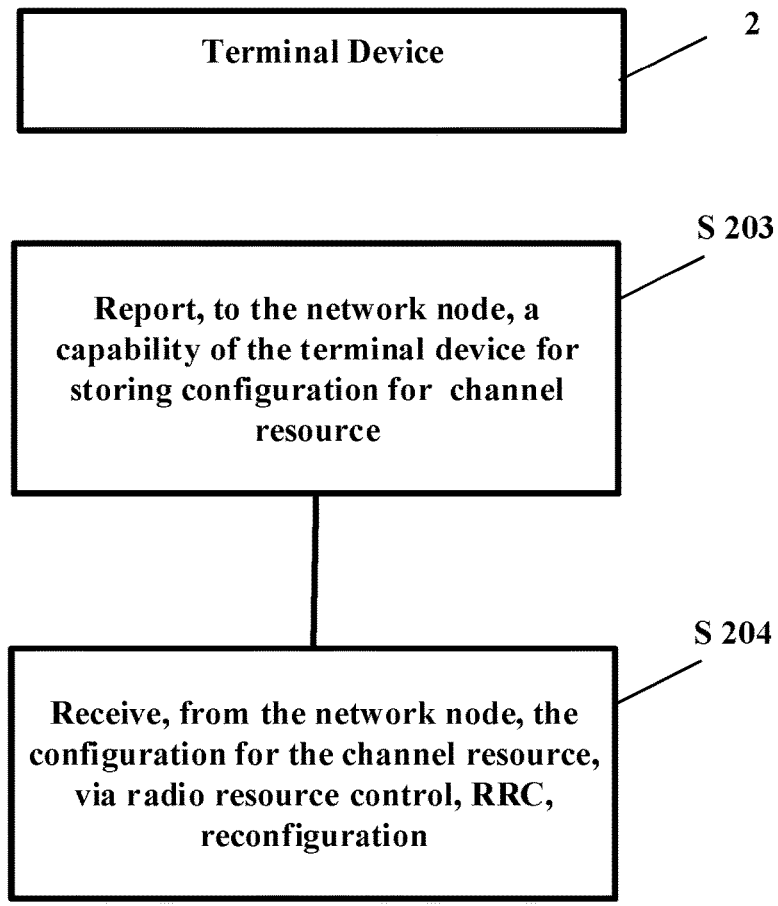
FIG. 5C is an exemplary flowchart showing other additional steps of the method performed at the terminal device for configuring channel resource, according to embodiments of the present disclosure.

FIG. 5C is an exemplary flowchart showing other additional steps of the method performed at the terminal device for configuring channel resource, according to embodiments of the present disclosure.

In embodiments of the present disclosure, the method may further comprise: S203, reporting, to the network node, a capability of the terminal device for storing configuration for channel resource; and S204, receiving, from the network node, the configuration for the channel resource, via radio resource control, RRC, reconfiguration.

According to embodiments of the present disclosure, the terminal device may previously report to the network node about the capability for storing configuration for channel resource. Then network node can preconfigure a plurality of configurations and send them to the terminal device, according to the capability of the terminal device. In the subsequent communication, in response a determination of changing to one of the plurality of configurations, the network node will transmit an indicator for the one of the plurality of configurations, as mentioned above.

Figure 6:
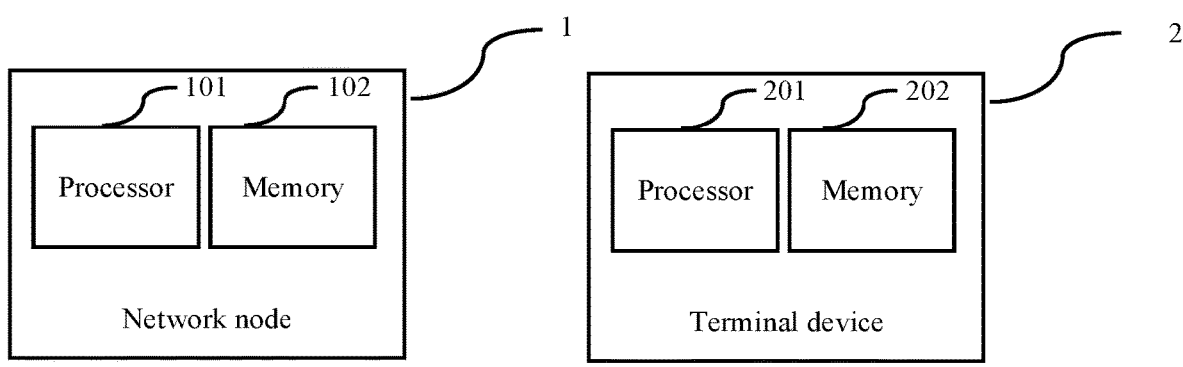
FIG. 6 is a block diagram showing exemplary apparatuses suitable for practicing the network node and the terminal device according to embodiments of the disclosure.

FIG. 6 is a block diagram showing exemplary apparatuses suitable for practicing the network node and the terminal device according to embodiments of the disclosure.

As shown in FIG. 6, the network node may comprise: a processor 101; and a memory 102. The memory 102 contains instructions executable by the processor 101, whereby the network node is operative to: determine a need to change radio frequency of a cell served by the network node; determine whether a configuration for channel resource to which the radio frequency to be changed has been received by a terminal device served in the cell; and transmit, to the terminal device, an indicator for the configuration for the channel resource, in response to that the configuration for the channel resource has been received by the terminal device.

In embodiments of the present disclosure, the network node 1 is operative to perform the method according to any of the above embodiments, such as these shown in FIG. 4A-4C.

As shown in FIG. 6, the terminal device may comprise: a processor 201; and a memory 202. The memory 202 contains instructions executable by the processor 201, whereby the terminal device is operative to: receive, from a network node serving a cell on which the terminal device camps, an indicator for a configuration for channel resource to which radio frequency of the cell to be changed. The configuration for the channel resource has been received by the terminal device. The cell is one of multiple cells the network node serves.

In embodiments of the present disclosure, the terminal device is operative to perform the method according to any embodiment of the above embodiments, such as these shown in FIG. 5A-5C.

The processors 101, 201 may be any kind of processing component, such as one or more microprocessor or microcontrollers, as well as other digital hardware, which may include digital signal processors (DSPs), special-purpose digital logic, and the like. The memories 102, 202 may be any kind of storage component, such as read-only memory (ROM), random-access memory, cache memory, flash memory devices, optical storage devices, etc.

Figure 7:
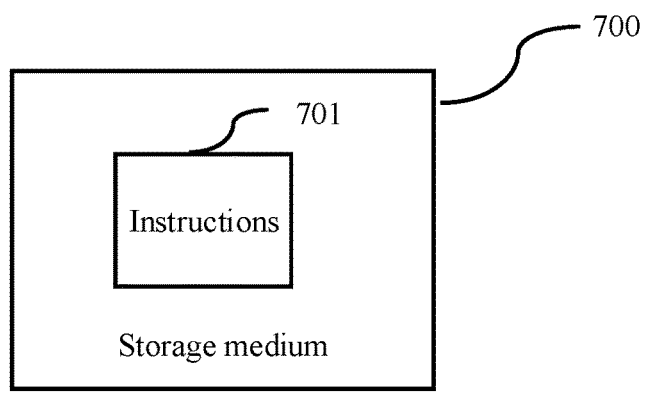
FIG. 7 is a block diagram showing an apparatus readable storage medium, according to embodiments of the present disclosure.

FIG. 7 is a block diagram showing an apparatus readable storage medium, according to embodiments of the present disclosure.

As shown in FIG. 7, the computer-readable storage medium 700, or any other kind of product, storing instructions 701 which when executed by at least one processor, cause the at least one processor to perform the method according to any one of the above embodiments, such as these shown in FIG. 4A-5C.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

Figure 8:
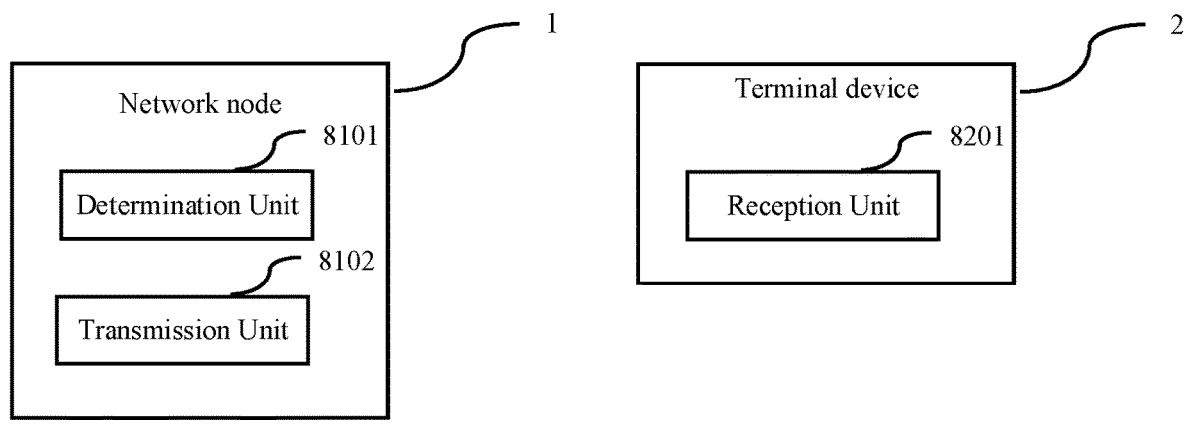
FIG. 8 is a schematic showing units for the network node and the terminal device, according to embodiments of the present disclosure.

FIG. 8 is a schematic showing units for the network node and the terminal device, according to embodiments of the present disclosure.

As shown in FIG. 8, the network node 1 may comprise: a determination unit 8101, configured to determine a need to change radio frequency of a cell served by the network node; and determine whether a configuration for channel resource to which the radio frequency to be changed has been received by a terminal device served in the cell; and a transmission unit 8102, configured to transmit, to the terminal device, an indicator for the configuration for the channel resource, in response to that the configuration for the channel resource has been received by the terminal device.

In embodiments of the present disclosure, the network node 1 is operative to perform the method according to any of the above embodiments, such as these shown in FIG. 4A-4C.

As shown in FIG. 8, the terminal device 2 may comprise a reception unit 8201, configured to receive, from a network node serving a cell in which the terminal device is registered, an indicator for a configuration for channel resource to which radio frequency of the cell to be changed. The configuration for the channel resource has been received by the terminal device. The cell is one of multiple cells the network node serves.

In embodiments of the present disclosure, the terminal device is operative to perform the method according to any of the above embodiments, such as those shown in FIG. 5A to 5C.

The term 'unit' may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the network node 100, may not need a fixed processor or memory, any computing resource and storage resource may be arranged from at least one network node/device/entity/apparatus relating to the communication system. The virtualization technology and network computing technology (e.g. cloud computing) may be further introduced, so as to improve the usage efficiency of the network resources and the flexibility of the network.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Particularly, these function units may be implemented either as a network element on a dedicated hardware, as a software instance running on a dedicated hardware, or as a virtualized function instantiated on an appropriate platform, e.g. on a cloud infrastructure.

Figure 9A:
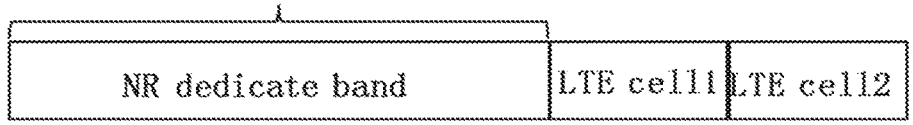
FIG. 9A is a schematic showing an example for CSI-RS configurations, according to embodiments of the present disclosure.
Figure 9A:
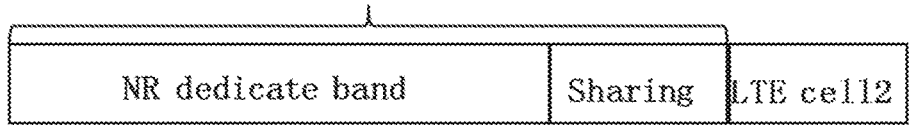
Figure 9A:
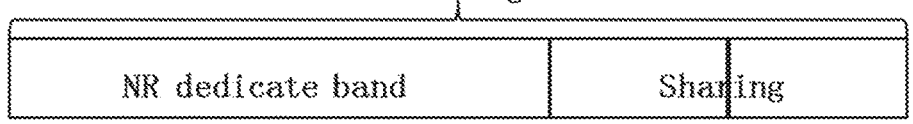

FIG. 9A is a schematic showing an example for CSI-RS configurations, according to embodiments of the present disclosure.

Only for better understanding but without any limitation, the following exemplary embodiment focuses on a scenario: NR and LTE are deployed with mix mode 4G and 5G NR over different numerologies for LTE with 15 KHz and for NR with others, such as 30 KHz, 60 KHz per subcarrier.

Instead of a method using RRC reconfiguration which will cost a lot of signals and may cause signal storm, the embodiments of the present disclosure configure multiple CSI-RS resources and reports which can use DCI to inform UE when spectrum sharing.

Multiple configurations for NR CSI-RS resources and reports are configured based on spectrum sharing requirement.

That is, for carrier-level spectrum sharing, the number of CSI-RS resources and reports are determined by the shared LTE cell number. However, the number of CSI-RS resources and reports are limited by UE capability.

These configurations will be transmitted to the terminal device previously, and then due to a determination of changing between those configurations, different CSI-RS report will be triggered by DCI for all the UE in the same time. That is, to schedule CSI-RS and PDSCH immediately which can save time window for bandwidth change.

Embodiments of the present disclosure can configure multiple CSI-RS resources and reports, which will use DCI to indicate UE the CSI-RS change when spectrum sharing. Therefore, the signal cost will be reduced, so as to avoid the signal storm and shorten the time window for bandwidth change.

The number of configurations for CSI-RS resource and report is related with UE capability and spectrum sharing requirement.

The max number of CSI resource and report which UE can support is indicated by UE capability information, from 3GPP TS 38.331 V15.9.0 (2020-03).

After a network node, such as gNB got this UE capability and based on NR band combination number, it determines the number of CSI configuration that can be configured to UE, which is the minimum value of UE capability and max NR band combination number:

Number_of_CSI_report=min (Number_of_CSI_report_UE_capability, Number_of_combined_NRband)

For carrier level spectrum sharing, to avoid the NR CSI-RS signal impact on LTE side. The BWP may not be changed, and the frequency band used for CSI-RS signal will be controlled by scheduler when spectrum sharing.

Configure multiple CSI-RS resources and reports according to the different spectrum sharing scenarios.

There are different implementations for the embodiments above. Here, one simple example is shown to prove their feasibility as in FIG. 9. The initial BWP is set to 100M bandwidth and it will not be changed. NR has 60M dedicate bandwidth, 2 LTE cells each with 20M bandwidth can be shared with NR.

In this case, up to 3 types of NR available bandwidth exist: {configuration #2, NR ABW (available band width) =60M (2 LTE cells are turned on), configuration #1, NR ABW=80M (1 LTE cell is turned on, another LTE cell is turned off), configuration #0, NR ABW=100M (2 LTE cells are turned off)}, each type of ABW need one CSI resource and report. Thus, 3 configurations for CSI-RS resource and report will be configured, each one will be related to one type of NR ABW. When spectrum sharing, i.e. changing, UE needs only to be informed about the updated configuration for CSI-RS resource and report.

Note that the configurations of above are only an example implementation. It can be set to other band combinations.

Figure 9B:
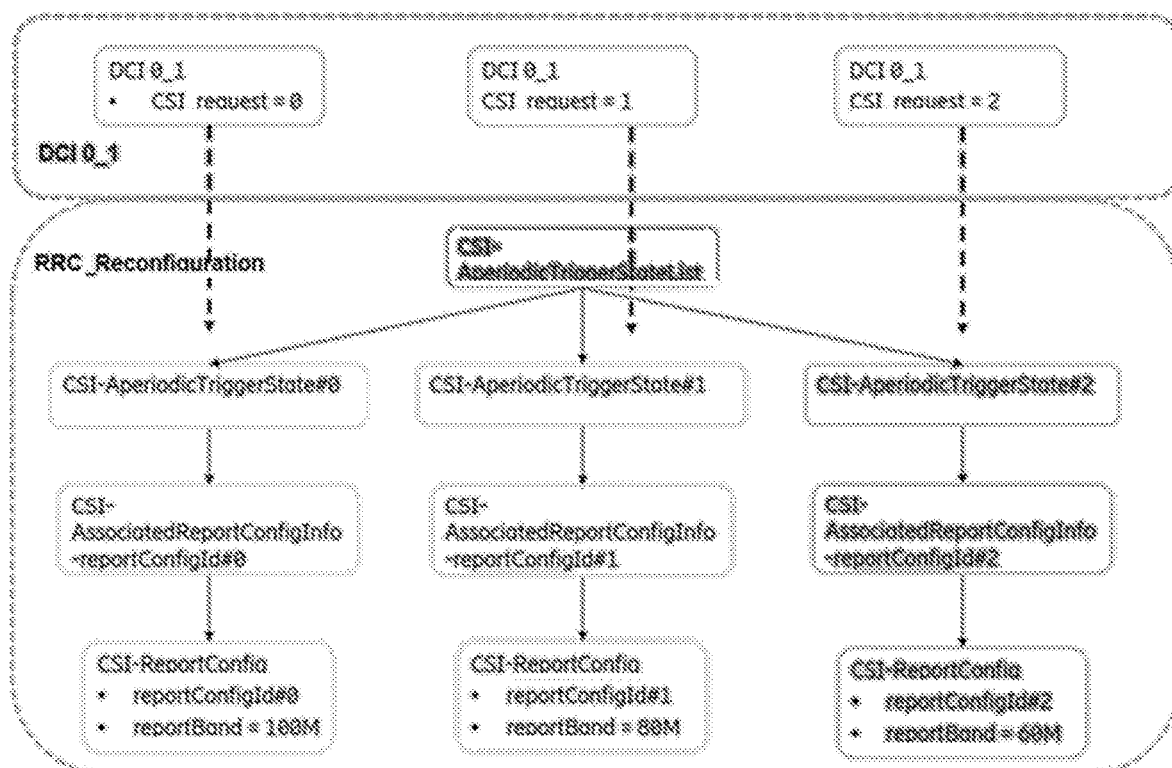
FIG. 9B is a schematic showing an example for CSI-RS configurations mapping to DCI, according to embodiments of the present disclosure.

FIG. 9B is a schematic showing an example for CSI-RS configurations mapping to DCI, according to embodiments of the present disclosure.

Configurations of multiple CSI-RS resource and report are sent to UE via RRC-reconfiguration signal after getting UE capability, and CSI-RS resource and report configuration for each possible ABW is configured as one triggering state in higher layer parameter AperiodicTriggerStateList.

That is, the configuration #0 for CSI-RS resource and report will be mapped to CSI-Aperiodic TriggerState #0, as presented by CSI-request 0, in DCI 0_1. The configuration #1 for CSI-RS resource and report will be mapped to CSI-Aperiodic TriggerState #1, as presented by CSI-request 1, in DCI 0_1. The configuration #2 for CSI-RS resource and report will be mapped to CSI-Aperiodic TriggerState #2, as presented by CSI-request 2, in DCI 0_1.

Figure 9C:
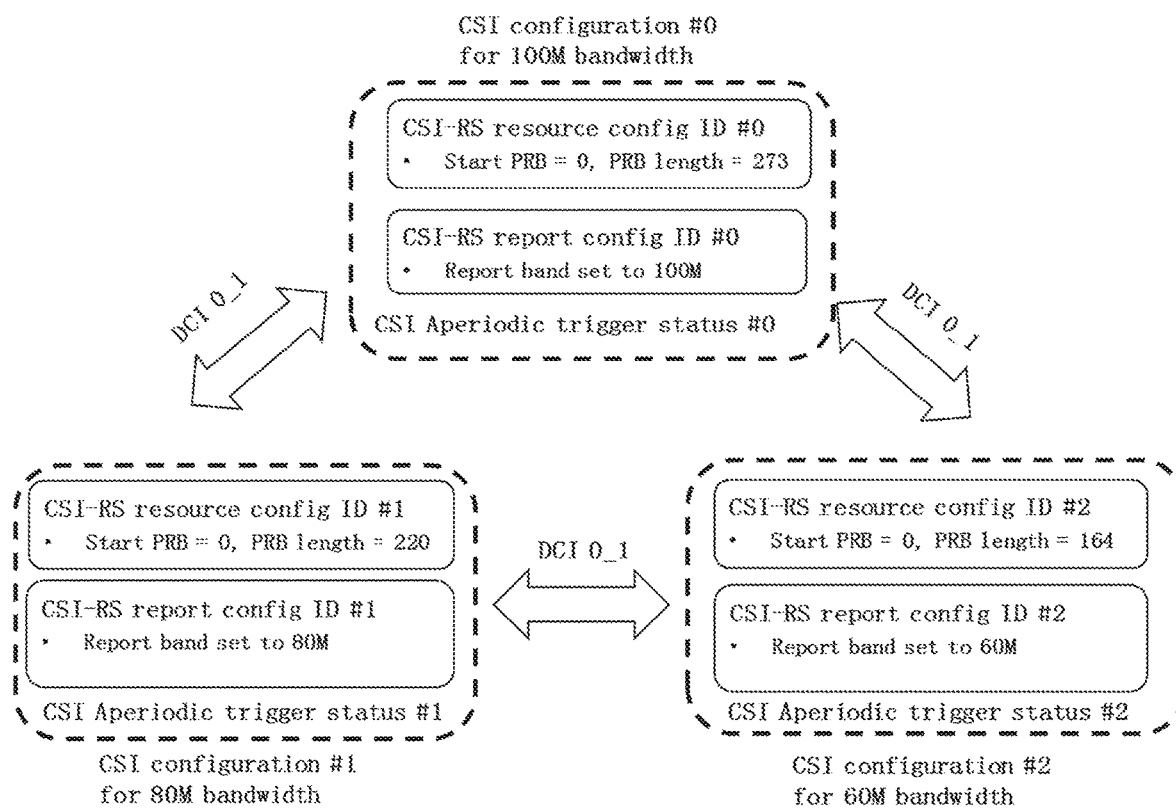
FIG. 9C is a schematic showing exchanging between different trigger statuses, according to embodiments of the present disclosure.

FIG. 9C is a schematic showing exchanging between different trigger statuses, according to embodiments of the present disclosure.

When the ABW is changed due to carrier level spectrum sharing, triggering state for new type of ABW is initiated using the CSIrequest field in DCI. A non-zero codepoint of the CSIrequest field in the DCI 0_1 may be mapped to a CSI triggering state according to the order of the associated positions of the up to $2^{N_{TS}}-1$ trigger states in CSI-AperiodicTriggerStateList with codepoint '1' mapped to the triggering state in the first position, where $N_{TS}$ is the number of bits in the DCI CSIrequest field configured by higher layer parameter reportTriggerSize.

The CSI-RS signal will be changed immediately in gNB by muting some bands for transmitting CSI-RS in L1 (layer 1) (e.g. from 100 Mhz→80 Mhz thus bandwidth of an LTE cell increases 20 Mhz), which means the CSI-RS will be limited in new type of ABW.

NR PDSCH scheduling band will be changed to the new type of ABW immediately.

Figure 9D:
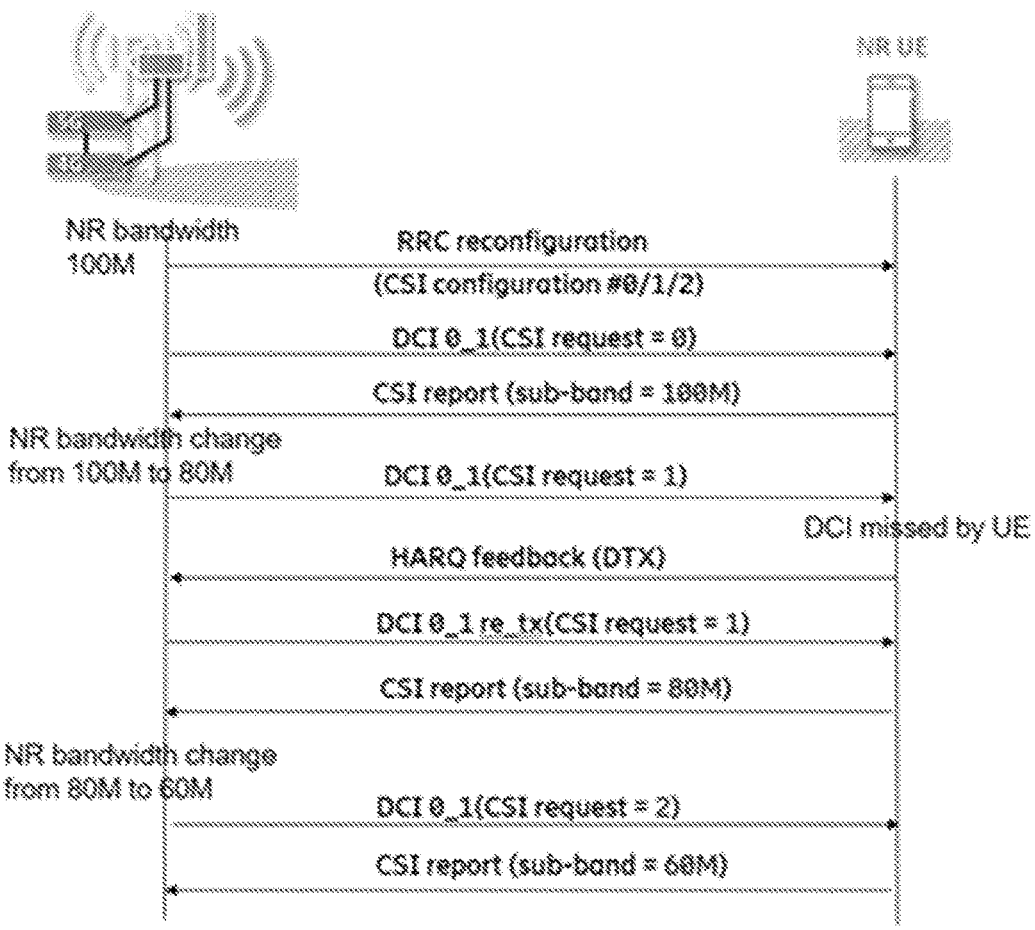
FIG. 9D is a schematic showing an example for DCI triggered CSI report signal exchange procedure, according to embodiments of the present disclosure.

FIG. 9D is a schematic showing an example for DCI triggered CSI report signal exchange procedure, according to embodiments of the present disclosure.

As shown in FIG. 9D, for example, during the communication between the base station and the UE, an RRC reconfiguration procedure is initiated by the base station to transmit configurations for the above mentioned 3 types of ABW (#0/1/2) to the terminal device, i.e. UE.

After the UE received and stored these configurations, whenever the type of the bandwidth needs to be changed between these 3 types of ABW, the base station sends a PDCCH message including a DCI 0_1 to the UE, instead of initiating another RRC reconfiguration procedure.

For example, the DCI 0_1 may include a CSIrequest, 0, to indicate the UE to change to the type of ABW #0 with 100 MHz. After UE receives this CSIrequest in DCI, the UE may directly measure the CSI-RS signal and send the CSI report based on the received CSI-RS signal, in new radio frequency in the ABW #0 indicated by CSI request in DCI. As another example shown in FIG. 9D, DCI 0_1 may include another CSI request, 2, to indicate the UE to change to the type of ABW #2 with 60 MHz.

Further, only for an example, FIG. 9D shows that the CSIrequest, 1, is missed by the UE. That is, the PDCCH is DTX (Discontinuous Transmission) or NACK (not acknowledge) at UE side, then the failure will be informed to gNB by HARQ (Hybrid Automatic Repeat reQuest) mechanism. Then, the PDCCH message may be retransmitted in next available slot.

Figure 9E:
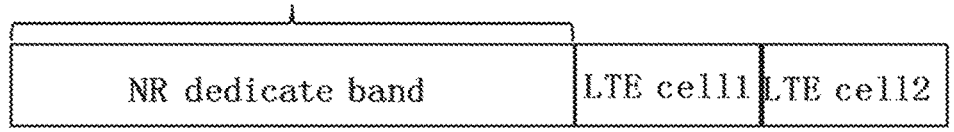
FIG. 9E is another schematic showing another example for CSI-RS configurations, according to embodiments of the present disclosure.
Figure 9E:
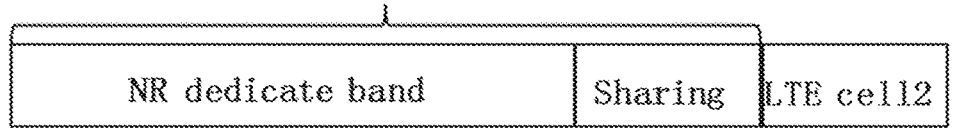

FIG. 9E is another schematic showing another example for CSI-RS configurations, according to embodiments of the present disclosure.

The number of CSI-RS, which can be used, depends on the UE capability which mentioned in 3GPP TS 38.331 V15.9.0 (2020-03): csi-ReportFramework→maxNumberAperiodicCSI-PerBWP-ForCSI-Report.

If the number of CSI-RS which UE can supported is smaller than the required number, RRC reconfiguration and DCI trigger method will be combined, and signals can be also reduced.

Below is an example showing steps at both sides of the terminal device and the network node illustrated above. In the example that NR cell(s) and LTE cell(s) share a total bandwidth, the network node make decision of switching bandwidth of an NR cell among 3 options (100M/80M/60M) and a UE can support only 2 CSI-RS report configurations. As shown in FIG. 9E, any two configurations, such as #2, #1, of the above 3 configurations may be used.

Figure 9F:
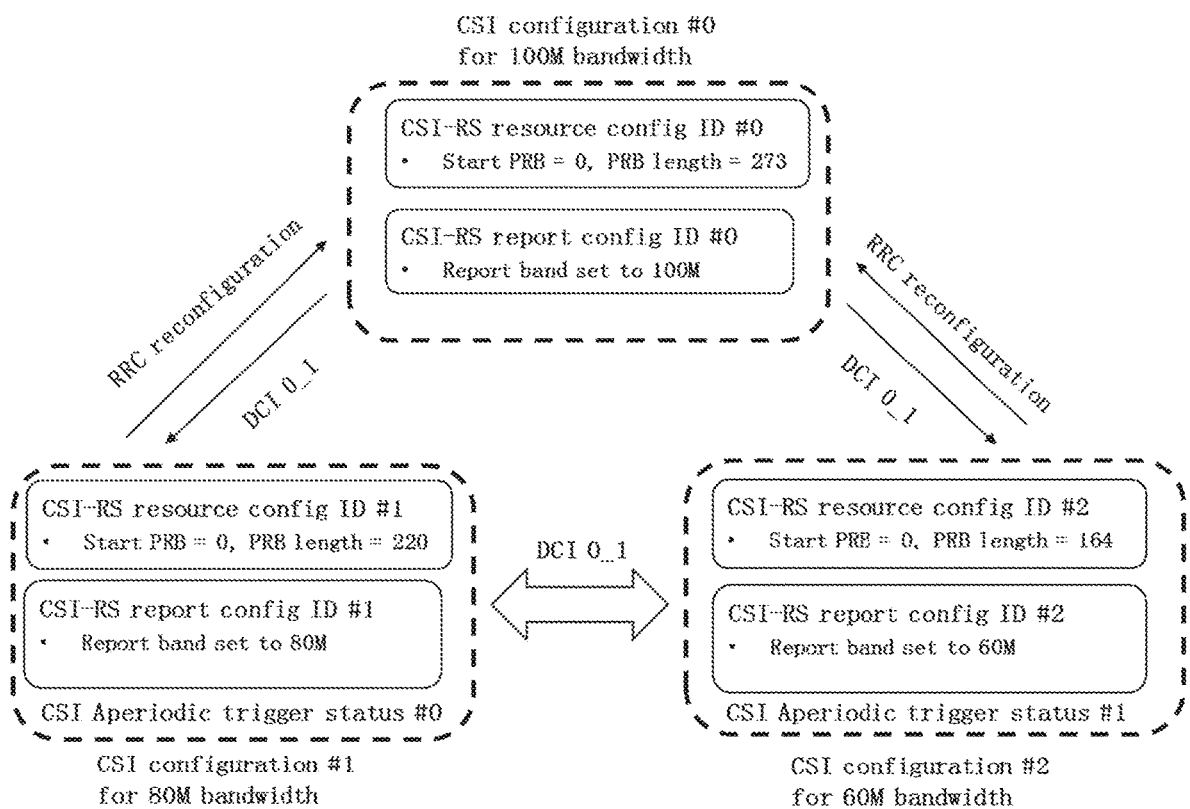
FIG. 9F is another schematic showing exchanging between different trigger statuses, according to embodiments of the present disclosure.

FIG. 9F is another schematic showing exchanging between different trigger statuses, according to embodiments of the present disclosure.

Figure 9G:
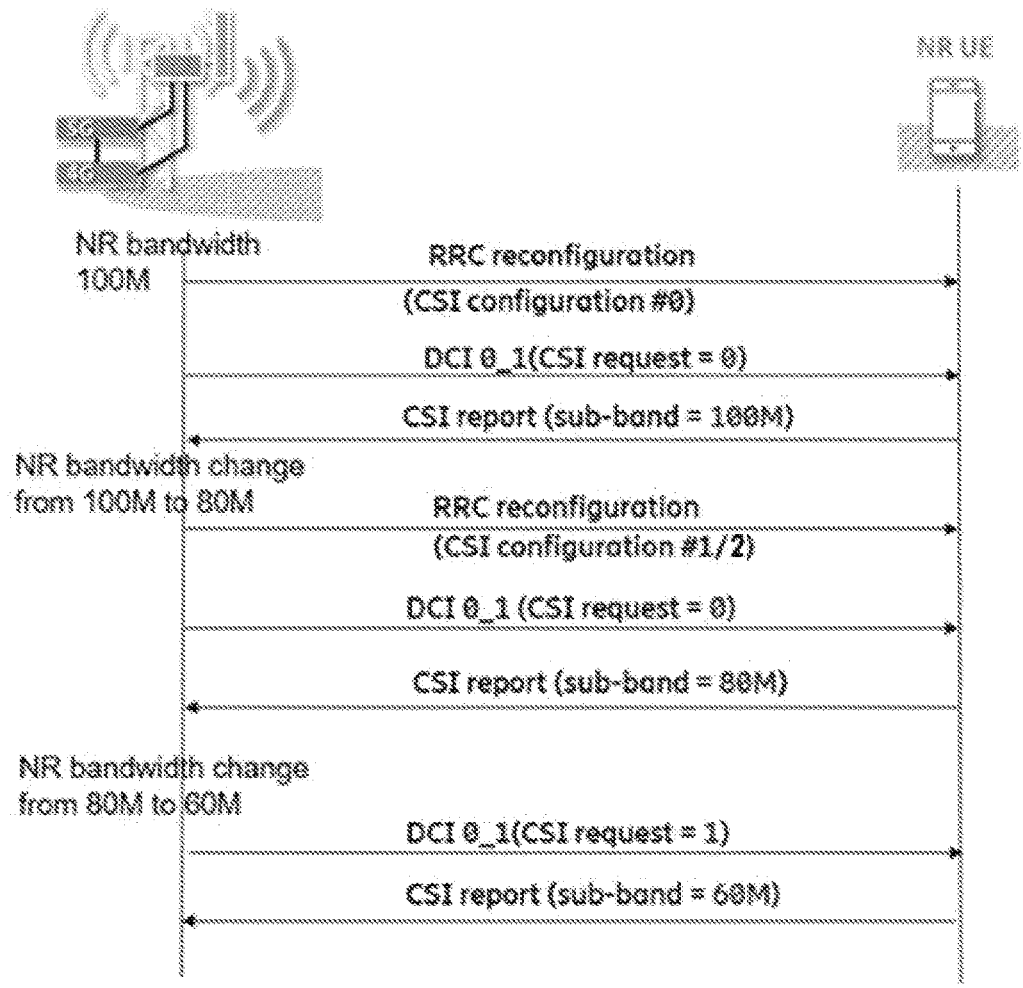
FIG. 9G is a schematic showing an example to combine RRC reconfiguration and DCI trigger active CSI report procedure, according to embodiments of the present disclosure.

FIG. 9G is a schematic showing an example to combine RRC reconfiguration and DCI trigger active CSI report procedure, according to embodiments of the present disclosure.

As shown in FIG. 9F, when exchanging between configurations #1, #2, the DCI may be used. Additionally, when spectrum of the NR cell is decided to switch from the configuration #0 to configurations #1 or #2, the DCI may also be used. However, when spectrum of the NR cell is decided to switch to the configuration #0 from configurations #1 or #2, RRC reconfiguration procedure may be used, since the configuration #0 is not stored by the terminal device.

Further, at this time, the configuration #0 for CSI-RS resource and report is not mapped to any CSI-Aperiodic TriggerState. The configuration #1 for CSI-RS resource and report will be mapped to CSI-Aperiodic TriggerState #0, as presented by CSI-request 0, in DCI 0_1. The configuration #2 for CSI-RS resource and report will be mapped to CSI-Aperiodic TriggerState #1, as presented by CSI-request 1, in DCI 0_1.

As shown in FIG. 9G, firstly, only the CSI configuration #0 is received and stored by the UE, via an RRC reconfiguration procedure. Then, the UE may report channel state information about the type of bandwidth of 100 MHz. Alternatively, the UE may receive the CSI request 0, in DCI 0_1, and then report channel state information about the type of bandwidth of 100 MHz.

When the NR bandwidth needs to be changed to 80 MHz, both the CSI configuration #1, and #2 are received and stored by the UE, via an RRC reconfiguration procedure. Then, the UE may receive the CSI request 0, in DCI 0_1, and report channel state information about the type of bandwidth of 80 MHz, or receive the CSI request 1, in DCI 0_1, and report channel state information about the type of bandwidth of 60 MHz.

It should be understood, any of the above RRC reconfiguration procedure may also be performed during an initial access. Namely, it may follow or be associated with an RRC connection setup procedure.

Figure 9H:
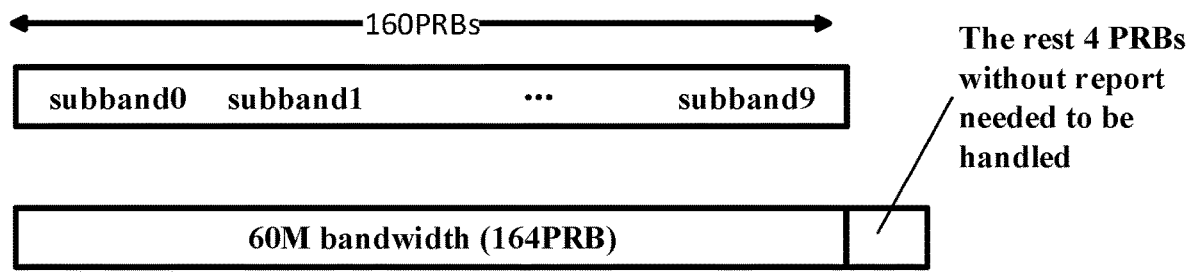
FIG. 9H is a schematic showing an example to handle CSI report, according to embodiments of the present disclosure.

FIG. 9H is a schematic showing an example to handle CSI report, according to embodiments of the present disclosure.

The CSI-ReportingBand in CSI-ReportConfig is used to control the reported CSI bandwidth, but the number of PRBs in the reported sub-band may not in agreement with the number of PRBs in CSI-RS resource configuration, the CSI report for the PRB which located in gap may be further handled.

For example, when the ABW is changed from 100M/80M to 60M, the CSI configuration #2 will be selected and informed to UE by DCI. The UE will recognize the CSI-ReportingBand is represented as a bitmap with a plurality bits (including bits respectively indicating each of subband 0-9) in this configuration, then UE reports the CSI and the reported band include these 160 PRBs. For example, 9 bits of the bitmap may have a value of "1" to indicate corresponding 9 subbands to be reported.

When gNB received the CSI report, it can be found that in the selected configuration, the PRB length is 164 in CSI-ResourceConfig, which means the last 4 (164−160=4) PRBs have no CSI report.

According to embodiments of the present disclosure, the last 4 (164−160=4) PRBs will use the same CSI report for the last sub-band.

According to embodiments of the present disclosure, the indicator for the configuration for the channel resource not only indicates the frequency range of the bandwidth for the channel (such as the ABW mentioned above), but also indicates the specific subbands needed to be reported. For example, the configuration for the channel resource, such as the CSI configurations above mentioned, may comprise a specific bitmap of CSI-ReportingBand indicating the subbands.

Figure 10:
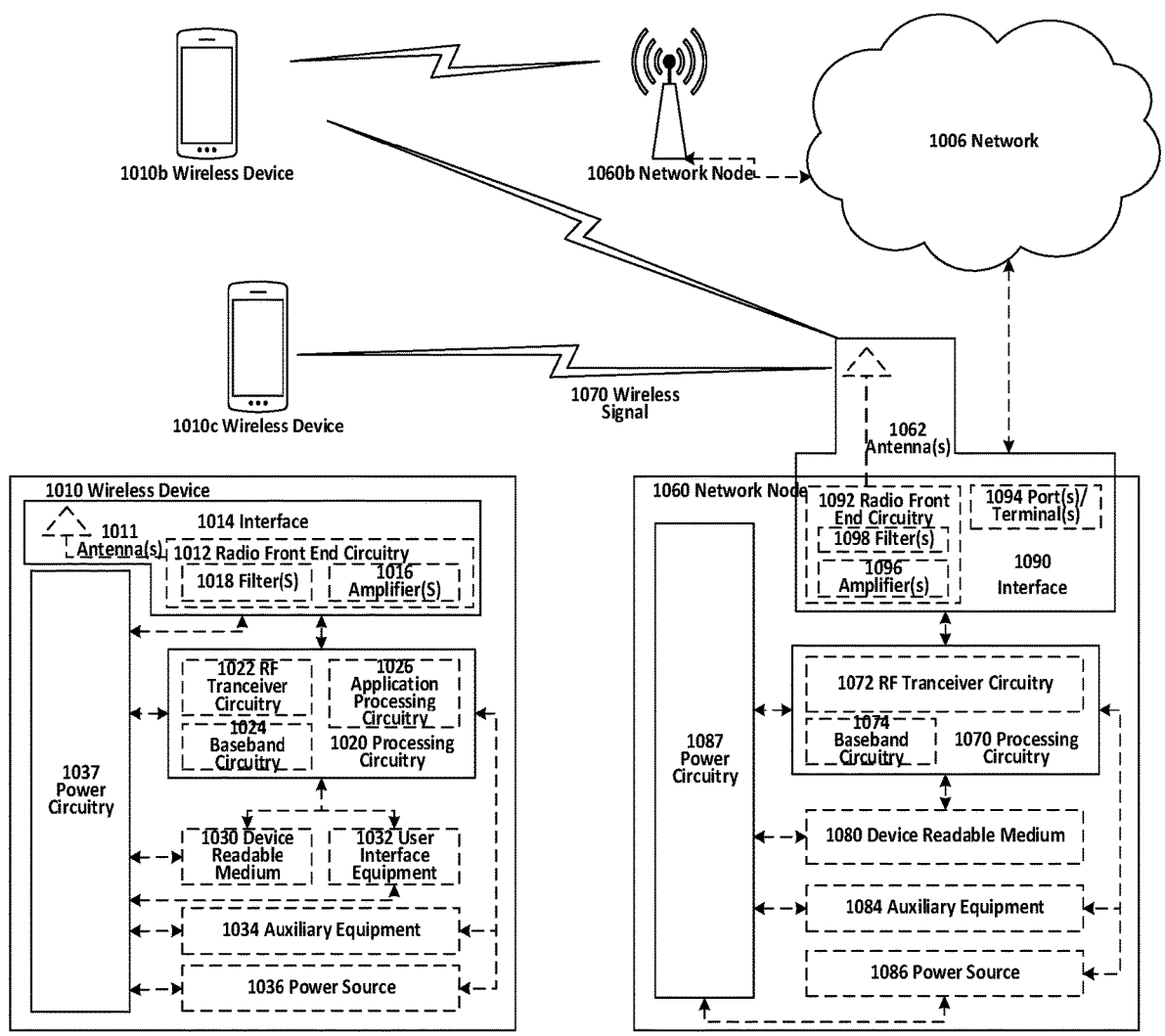
FIG. 10 is a schematic showing a wireless network in accordance with some embodiments.

FIG. 10 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 (corresponding to network side node) and 1060b, and WDs (corresponding to terminal device) 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
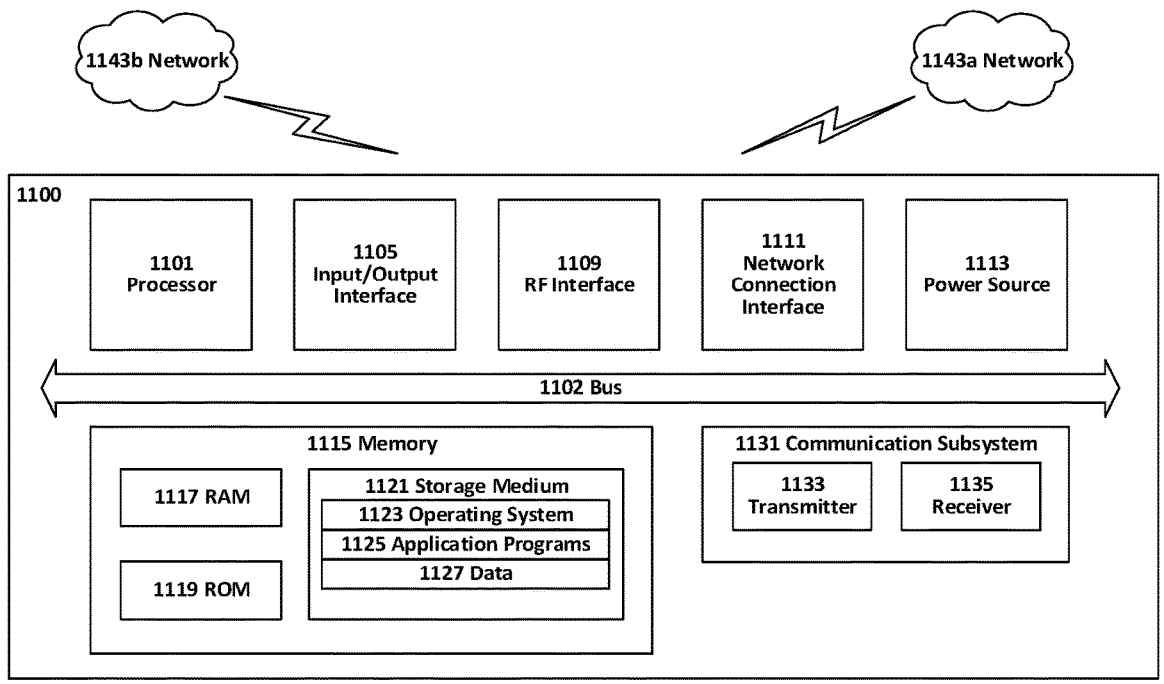
FIG. 11 is a schematic showing a user equipment in accordance with some embodiments.

FIG. 11 is a schematic showing a user equipment in accordance with some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
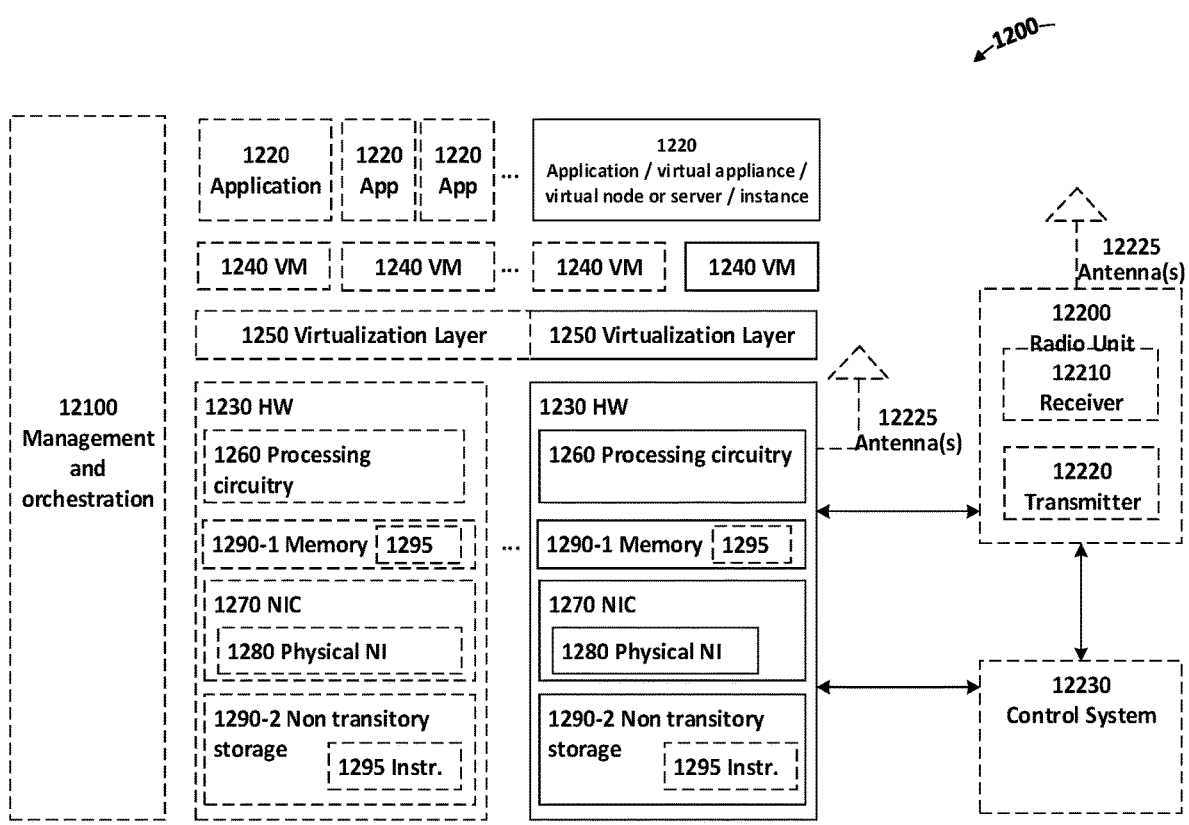
FIG. 12 is a schematic showing a virtualization environment in accordance with some embodiments.

FIG. 12 is a schematic showing a virtualization environment in accordance with some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
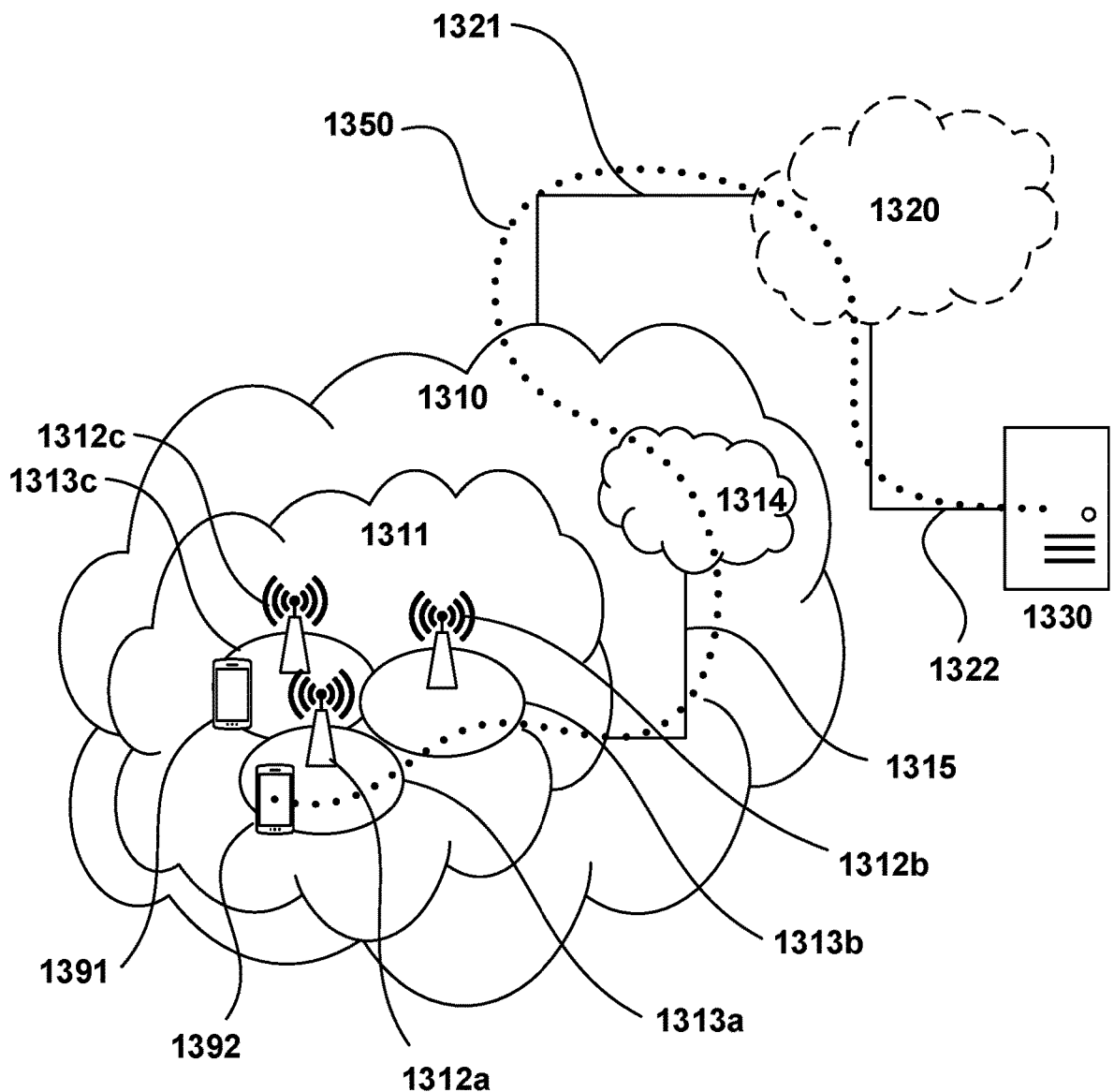
FIG. 13 is a schematic showing a telecommunication network connected via an intermediate network to a host computer in accordance with some embodiments.

FIG. 13 is a schematic showing a telecommunication network connected via an intermediate network to a host computer in accordance with some embodiments.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
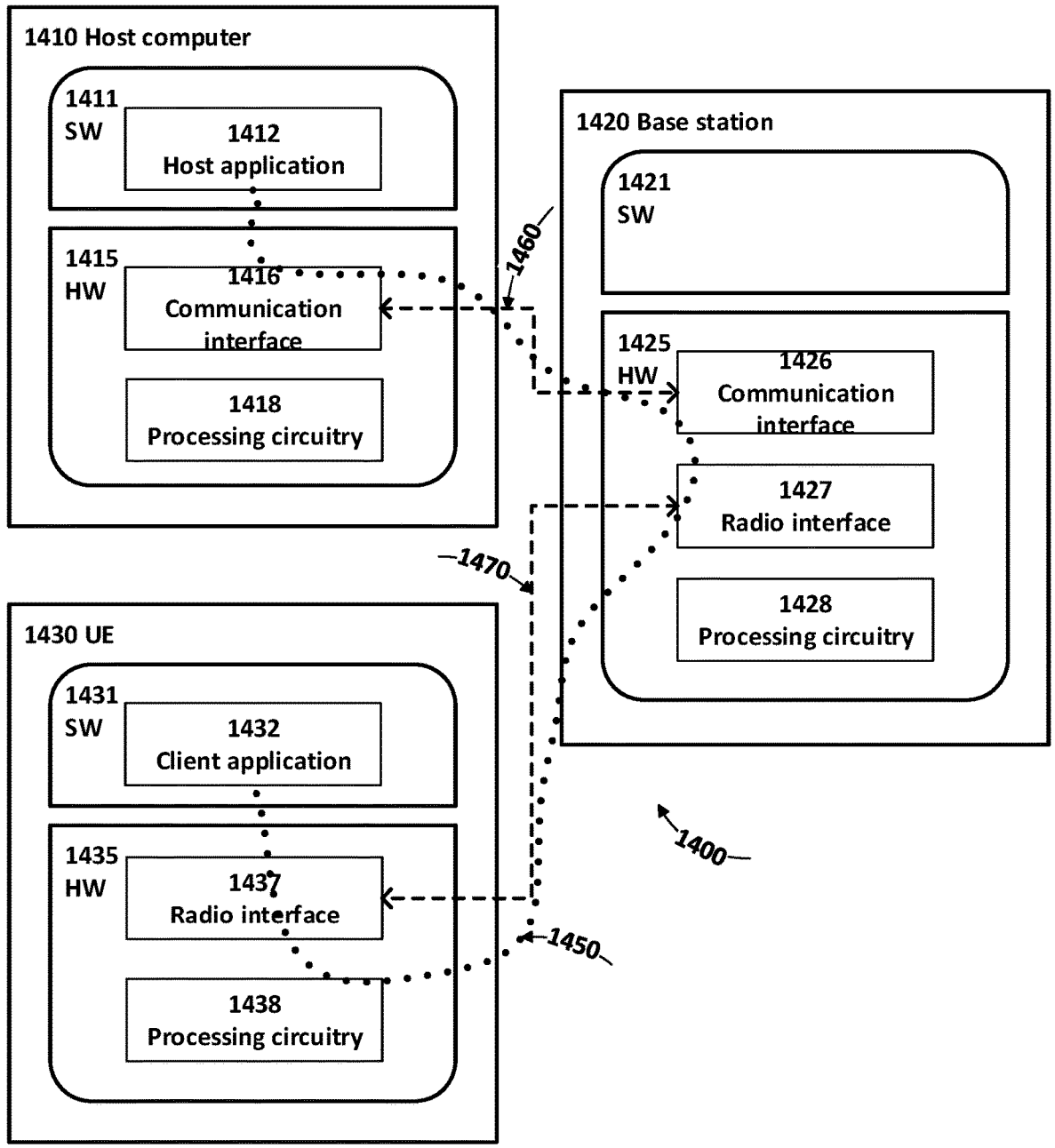
FIG. 14 is a schematic showing a host computer communicating via a base station with a user equipment over a partially wireless connection in accordance with some embodiments.

FIG. 14 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
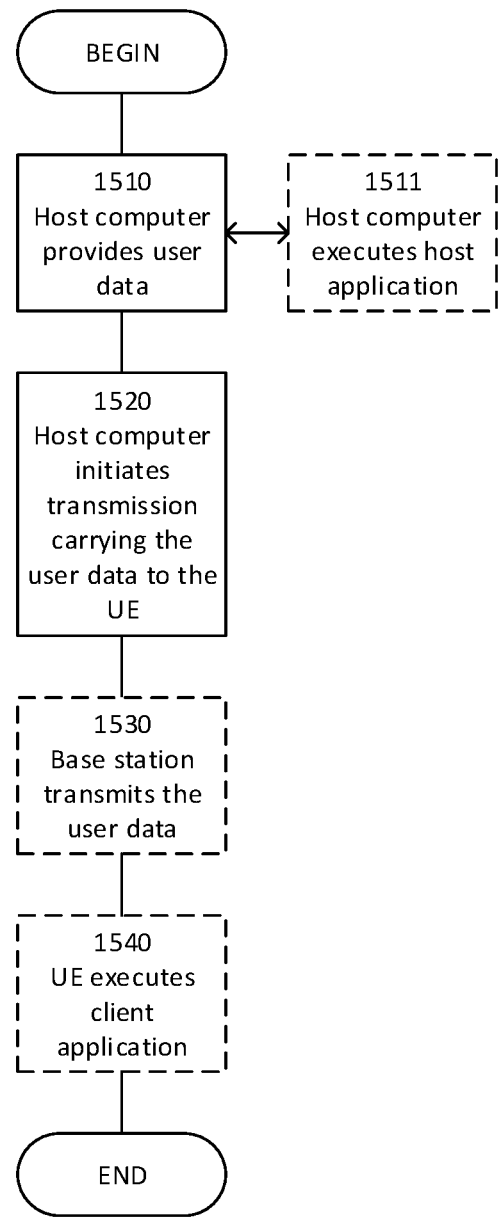
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
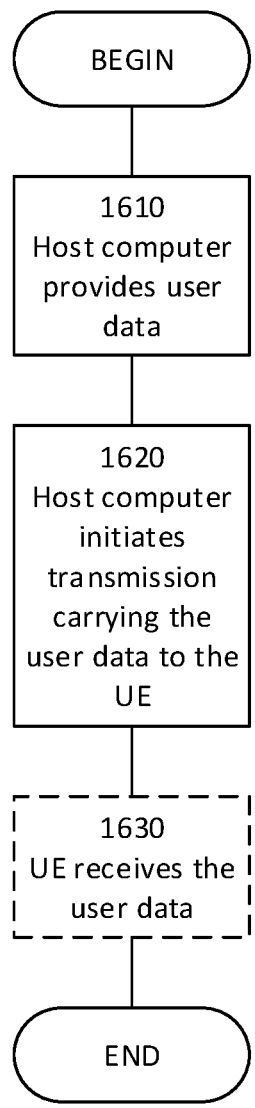
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
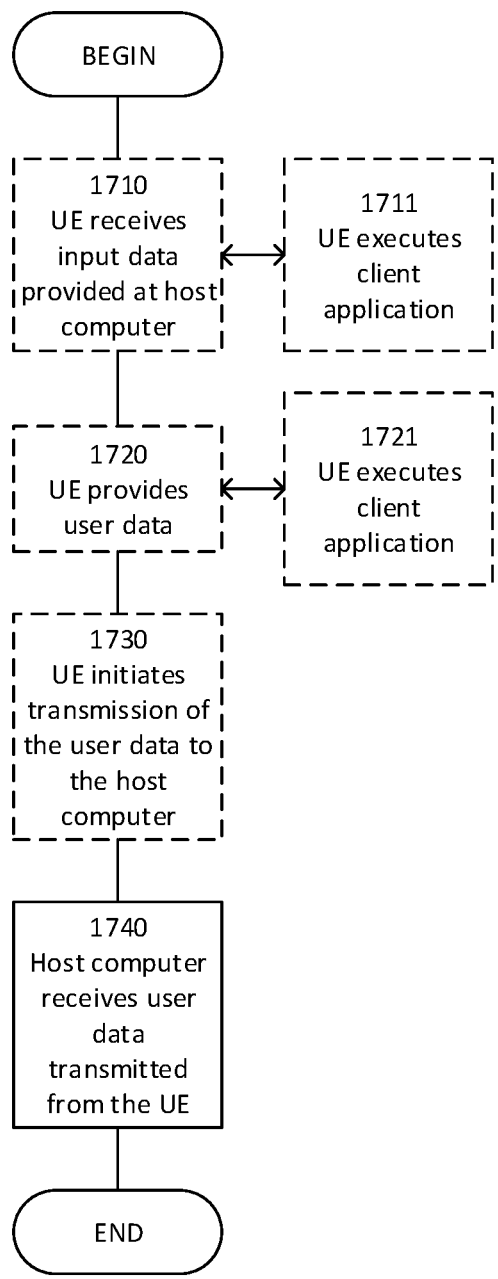
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
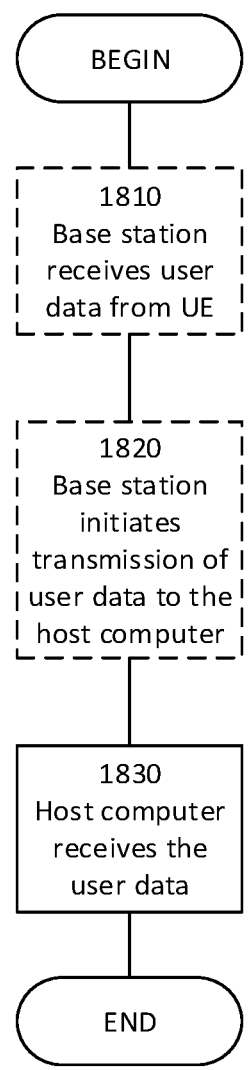
FIG. 18 is a schematic showing methods implemented in a communication system including a host computer, a base station and a user equipment in accordance with some embodiments.

FIG. 18 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:
1. A method performed at a network node, comprising:
   determining a need to change radio frequency of a cell served by the network node;

determining whether a configuration for channel resource to which the radio frequency to be changed has been received by a terminal device served in the cell; and transmitting, to the terminal device, an indicator for the configuration for the channel resource, in response to that the configuration for the channel resource has been received by the terminal device.

2. The method according to claim 1, wherein a reference signal is transmitted in the channel resource to indicate channel quality of the channel resource; and optionally, wherein the reference signal comprises a channel state information reference signal, CSI-RS.

3. The method according to claim 2,
wherein the indicator further indicates at least one subband in the channel resource; and
wherein channel state information of the at least one subband is required to be reported to the network node.

4. The method according to claim 1, wherein the indicator is included in a field of downlink control information, DCI; and optionally, wherein the indicator comprises a non-zero codepoint of a channel state information, CSI, request field.

5. The method according to claim 1, further comprising:
transmitting, to the terminal device, the configuration for channel resource to which the radio frequency to be changed, if the configuration for the channel resource has not been received by the terminal device;
wherein the configuration for channel resource is transmitted to the terminal device, via radio resource control, RRC, reconfiguration.

6. The method according to claim 1, further comprising:
determining a capability of the terminal device for storing configuration for channel resource; and
transmitting, to the terminal device, the configuration for channel resource according to the capability of the terminal device, via radio resource control, RRC, reconfiguration; and optionally, wherein the network node comprises a base station.

7. A method performed at a terminal device, comprising:
receiving, from a network node serving a cell in which the terminal device is registered, an indicator for a configuration for channel resource to which radio frequency of the cell to be changed;
wherein the configuration for the channel resource has been received by the terminal device; and
wherein the cell is one of multiple cells the network node serves.

8. The method according to claim 7, wherein a reference signal is transmitted in the channel resource to indicate channel quality of the channel resource; and optionally, wherein the reference signal comprises a channel state information reference signal, CSI-RS.

9. The method according to claim 8,
wherein the indicator further indicates at least one subband in the channel resource; and
wherein channel state information of the at least one subband is required to be reported to the network node.

10. The method according to claim 7, wherein the indicator is included in a field of downlink control information, DCI; and optionally, wherein the indicator comprises a non-zero codepoint of a channel state information, CSI, request field.

11. The method according to claim 7, further comprising:
receiving, from the network node, another configuration for channel resource;
wherein the another configuration for channel resource has not been received and thus not stored in the terminal device; and
wherein the another configuration for channel resource is received from the network node, via radio resource control, RRC, reconfiguration.

12. The method according to claim 7, further comprising:
reporting, to the network node, a capability of the terminal device for storing configuration for channel resource; and
receiving, from the network node, the configuration for the channel resource, via radio resource control, RRC, reconfiguration; and optionally, wherein the network node comprises a base station.

13. A network node, comprising:
a processor; and
a memory, the memory containing instructions executable by the processor, whereby the network node is operative to:
determine a need to change radio frequency of a cell served by the network node;
determine whether a configuration for channel resource to which the radio frequency to be changed has been received by a terminal device served in the cell; and
transmit, to the terminal device, an indicator for the configuration for the channel resource, in response to that the configuration for the channel resource has been received by the terminal device.

14. The network node according to claim 13, wherein the network node is further operative to:
transmit, to the terminal device, the configuration for channel resource to which the radio frequency to be changed, if the configuration for the channel resource has not been received by the terminal device;
wherein the configuration for channel resource is transmitted to the terminal device, via radio resource control, RRC, reconfiguration.

15. A terminal device, comprising:
a processor; and
a memory, the memory containing instructions executable by the processor, whereby the terminal device is operative to:
receive, from a network node serving a cell on which the terminal device camps, an indicator for a configuration for channel resource to which radio frequency of the cell to be changed;
wherein the configuration for the channel resource has been received by the terminal device; and
wherein the cell is one of multiple cells the network node serves.

16. The terminal device according to claim 15, wherein the terminal device is further operative to:
receive, from the network node, another configuration for channel resource;
wherein the another configuration for channel resource has not been received and thus not stored in the terminal device; and
wherein the another configuration for channel resource is received from the network node, via radio resource control, RRC, reconfiguration.

* * * * *